United States Patent [19]
Krakirian

[11] Patent Number: 5,504,868
[45] Date of Patent: Apr. 2, 1996

[54] SCSI COMMAND DESCRIPTOR BLOCK PARSING STATE MACHINE

[75] Inventor: Shahe H. Krakirian, Milpitas, Calif.

[73] Assignee: Adaptec, Incorporated, Milpitas, Calif.

[21] Appl. No.: 205,003

[22] Filed: Mar. 1, 1994

[51] Int. Cl.⁶ .................................................. G06F 9/30
[52] U.S. Cl. ........................................ 395/375; 395/825
[58] Field of Search ..................................... 395/375, 825

[56] References Cited

U.S. PATENT DOCUMENTS

| | | | |
|---|---|---|---|
| 4,843,544 | 6/1989 | DuLac et al. | 395/250 |
| 4,965,801 | 10/1990 | DuLac | 371/40.1 |
| 5,249,279 | 9/1993 | Schmenk et al. | 395/825 |

OTHER PUBLICATIONS

Data Sheet, Jan. 1994, "AIC–7110 High–Performance Integrated SCSI Mass Storage Controller", Adaptec, Inc., pp. i–140.

Preliminary Data Sheet, Apr. 1993, "AIC–8210 Dual–Bit Automated High–Performance SCSI Controller IC", Adaptec, Inc., pp. i–288.

"Fast Track to SCSI—A Product Guide", Fujitsu Microelectronics, Inc., Integrated Circuits Division, Prentice–Hall, Inc., 1991, pp. iii Through Index–7.

*Primary Examiner*—David L. Robertson
*Attorney, Agent, or Firm*—Skjerven, Morrill, MacPherson, Franklin & Friel; T. Lester Wallace

[57] ABSTRACT

A hard disk controller integrated circuit of a SCSI target device comprises a dedicated command descriptor block "CDB" parsing state machine. The dedicated CDB parsing state machine parses incoming six-byte, ten-byte and twelve-byte SCSI command descriptor blocks and writes information from corresponding fields in the six-byte, ten-byte and twelve-byte SCSI command descriptor blocks into predetermined memory locations. In some embodiments, there are sixteen such predetermined memory locations which together comprise a 16×8 register file. A microprocessor coupled to the hard disk controller integrated circuit is therefore relieved of the burden of parsing incoming SCSI command descriptor blocks.

13 Claims, 31 Drawing Sheets

Microfiche Appendix Included
(4 Microfiche, 225 Pages)

Operation Code of a Command Descriptor Block

|  | Bit 7 | Bit 6 | Bit 5 | Bit 4 | Bit 3 | Bit 2 | Bit 1 | Bit 0 |
|---|---|---|---|---|---|---|---|---|
| Byte 0 | Group Code ||| Command Code |||||

FIG. 2A
(PRIOR ART)

Six-Byte Command Descriptor Block

|  | Bit 7 | Bit 6 | Bit 5 | Bit 4 | Bit 3 | Bit 2 | Bit 1 | Bit 0 |
|---|---|---|---|---|---|---|---|---|
| Byte 0 | Operation Code ||||||||
| Byte 1 | Logical Unit Number ||| Logical Block Address (if required) |||| (MSB) |
| Byte 2 | Logical Block Address (if required) ||||||||
| Byte 3 | Logical Block Address (if required) testify |||||||| (LSB) |
| Byte 4 | Transfer Length (if required) ||||||||
| Byte 5 | Control Byte ||||||||

FIG. 2B
(PRIOR ART)

Ten-Byte Command Descriptor Block

|  | Bit 7 | Bit 6 | Bit 5 | Bit 4 | Bit 3 | Bit 2 | Bit 1 | Bit 0 |
|---|---|---|---|---|---|---|---|---|
| Byte 0 | Operation Code ||||||||
| Byte 1 | Logical Unit Number ||| Reserved |||| RelAdr |
| Byte 2 | Logical Block Address (if required) |||||||(MSB) |
| Byte 3 | Logical Block Address (if required) ||||||||
| Byte 4 | Logical Block Address (if required) ||||||||
| Byte 5 | Logical Block Address (if required) |||||||(LSB) |
| Byte 6 | Reserved ||||||||
| Byte 7 | Transfer Length (if required) |||||||(MSB) |
| Byte 8 | Transfer Length (if required) |||||||(LSB) |
| Byte 9 | Control Byte ||||||||

FIG. 2C
(PRIOR ART)

Twelve-Byte Command Descriptor Block

|         | Bit 7 | Bit 6 | Bit 5 | Bit 4 | Bit 3 | Bit 2 | Bit 1 | Bit 0 |
|---------|-------|-------|-------|-------|-------|-------|-------|-------|
| Byte 0  | Operation Code ||||||||
| Byte 1  | Logical Unit Number ||| Reserved |||| RelAdr |
| Byte 2  | Logical Block Address (if required) (MSB) ||||||||
| Byte 3  | Logical Block Address (if required) ||||||||
| Byte 4  | Logical Block Address (if required) ||||||||
| Byte 5  | Logical Block Address (if required) (LSB) ||||||||
| Byte 6  | Transfer Length (if required) (MSB) ||||||||
| Byte 7  | Transfer Length (if required) ||||||||
| Byte 8  | Transfer Length (if required) ||||||||
| Byte 9  | Transfer Length (if required) (LSB) ||||||||
| Byte 10 | Reserved ||||||||
| Byte 11 | Control Byte ||||||||

FIG. 2D
(PRIOR ART)

SCSI Interface Portion Registers

| bit | HCONFIG, R/W, 00h | HSADR, R/W, 01h | HSEQEN, R/W, 02h | HSEQSTAT, R/W, 03h | HSEQINTEN, R/W, 04h |
|---|---|---|---|---|---|
| 7 |  |  | S_RUN | SEQDONE | SEQDONEINT |
| 6 | STIMSEL1 |  | MPSTOP | CDBDONE | CDBDONEINT |
| 5 | STIMSEL0 | SADR5 | STEP | CCOCR | CCOCRINT |
| 4 | ENWIDEARB | SADR4 | SELODUMB | DISCSTOCR | DISCSTOCRINT |
| 3 | ENACTNEG | SADR3 | ENRSELI | RSELIOCR | RSELIOCRINT |
| 2 | MAXLUN2 | SADR2 | ENSELI | SELIOCR | SELIOCRINT |
| 1 | MAXLUN1 | SADR1 |  | RSELOCMP | RSELOCMPINT |
| 0 | MAXLUN0 | SADR0 | ENSELO | SELOCMP | SELOCMPINT |

| bit | HXFREN, R/W, 05h | HXFRSTAT, R/W, 06h | HXFRINTEN, R/W, 07h | HERREN, R/W, 08h | HERRSTAT, R/W, 09h |
|---|---|---|---|---|---|
| 7 | ENSDPIO | SDPIODONE | SDPIODONEINT | REQACKTEST | SRSTOCR |
| 6 | ENCFPIO | CFPIODONE | CFPIODONEINT | ENSPARCHK | SPARERR |
| 5 | ENCFLUSH | CFLUSHDONE | CFLUSHDONEINT | XATE | UNEXATN |
| 4 | ENBDMA | BDMADONE | BDMADONEINT |  | UNEXDATA |
| 3 | ENHXCWRAP | HXCWRAPPED | HXCWRAPPEDINT | ENBFREEOCR | BUFDERR |
| 2 |  | HXCDONE | HXCDONEINT | ENPHASEMIS | BFREEOCR |
| 1 |  |  |  |  | PHASEMIS |
| 0 | DMATEST |  |  | ENREQON | REQON |

| bit | HERRINTEN, R/W, 0Ah | HCTL0, R/W, 0Bh | HSTAT0, R, 0Ch | HCTL1, R/W, 0Dh | HSTAT1, R/W, 0Eh |
|---|---|---|---|---|---|
| 7 | SRSTOCRINT | ENAWR | AWR | CFLOCK_M | XDONE |
| 6 | SPARERRINT | ENESP | ESP | CFLOCK_S | QFULL |
| 5 | UNEXANTINT | ESPRD | NORMWR | XIP | TAGNOK |
| 4 | UNEXDATAINT | XCONT | NORMRD | DP | QTAG2 |
| 3 | BUFDERRINT | DISCNWR | INITMATCH | WROP | QTAG1 |
| 2 | BFREEOCRINT | DISCNRD | ENQTAG |  | IDEN |
| 1 | PHASEMISINT | DISCST | HWIDE |  | OC |
| 0 | REQONINT | DISCXFR | SYNCXFR |  | QACT |

KEY TO FIG. 5A

| FIG. 5A-1 |
|---|
| FIG. 5A-2 |

|   | HCTL2, R/W, 0Fh | HSTAT2, R/W, 10h | HACT_IDQ, R/W, 11h | HACT_QT2, R/W, 12h | HIDOUT, R/W, 13h |
|---|---|---|---|---|---|
| 7 | OPSTCNTCLR | SLRSLI |  | ACT_QT2_7 | OWNID3 |
| 6 | DFIFORST | SLRSLO |  | ACT_QT2_6 | OWNID2 |
| 5 | ENCCWR | ARB | ACT_QTAG | ACT_QT2_5 | OWNID1 |
| 4 | ENCCRD | ATNILAT |  | ACT_QT2_4 | OWNID0 |
| 3 | LDACT | SELIDUMB | ACT_IDEN | ACT_QT2_3 | DESTID3 |
| 2 |  | BUSFREE | ACT_LUN2 | ACT_QT2_2 | DESTID2 |
| 1 | GPB1 | SELIN | ACT_LUN1 | ACT_QT2_1 | DESTID1 |
| 0 | GPB0 | ARBWON | ACT_LUN0 | ACT_QT2_0 | DESTID0 |

|   | HOTHERID, R/W, 14h | HSIGO, R/W, 15h | HSIGI, R, 16h | HSIGDIR, R/W, 17h | HDOR0, R/W, 18h |
|---|---|---|---|---|---|
| 7 |  | SELO | SELI |  | HDOR_7 |
| 6 |  | BSYO | BSYI |  | HDOR_6 |
| 5 |  | REQO | REQI | SRSTO | HDOR_5 |
| 4 | NOID | ACKO | ACKI | TARG | HDOR_4 |
| 3 | OTHERID3 | ATNO | ATNI | INIT | HDOR_3 |
| 2 | OTHERID2 | CDO | CDI | SDHOEN | HDOR_2 |
| 1 | OTHERID1 | IOO | IOI | SDLOEN | HDOR_1 |
| 0 | OTHERID0 | MSGO | MSGI | ARBO | HDOR_0 |

|   | HDOR1, R/W, 19h | HDI0, R/W, 1Ah | HDI1, R, 1Bh | HDILAT0, R, 1Ch | HDILAT1, R, 1Dh |
|---|---|---|---|---|---|
| 7 | HDOR_15 | HDI_7 | HDI_15 | HDILAT_7 | HDILAT_15 |
| 6 | HDOR_14 | HDI_6 | HDI_14 | HDILAT_6 | HDILAT_14 |
| 5 | HDOR_13 | HDI_5 | HDI_13 | HDILAT_5 | HDILAT_13 |
| 4 | HDOR_12 | HDI_4 | HDI_12 | HDILAT_4 | HDILAT_12 |
| 3 | HDOR_11 | HDI_3 | HDI_11 | HDILAT_3 | HDILAT_11 |
| 2 | HDOR_10 | HDI_2 | HDI_10 | HDILAT_2 | HDILAT_10 |
| 1 | HDOR_9 | HDI_1 | HDI_9 | HDILAT_1 | HDILAT_9 |
| 0 | HDOR_8 | HDI_0 | HDI_8 | HDILAT_0 | HDILAT_8 |

FIG. 5B-1

SCSI Interface Portion Registers

| | HRSTPARI, R/W, 1Eh | HCFCNT, R/W, 1Fh | HCFPTR, R/W, 20h | HCFIFOF-HCFIFO0, R/W, 21h-30h | HOFSTCNT, R, 31h |
|---|---|---|---|---|---|
| 7 | IDWINS | | | CFIFOn_7 | |
| 6 | OWNIDON | | | CFIFOn_6 | |
| 5 | NOSRC | | | CFIFOn_5 | |
| 4 | MULTISRC | CFCNT4 | | CFIFOn_4 | |
| 3 | LUNLEMAX | CFCNT3 | CFPTR3 | CFIFOn_3 | OFSTCNT3 |
| 2 | SRSTI | CFCNT2 | CFPTR2 | CFIFOn_2 | OFSTCNT2 |
| 1 | HDPI1 | CFCNT1 | CFPTR1 | CFIFOn_1 | OFSTCNT1 |
| 0 | HDPI0 | CFCNT0 | CFPTR0 | CFIFOn_0 | OFSTCNT0 |

| | HXCTR0, R/W, 32h | HXCTR1, R/W, 33h | HIA_CONFIG, R/W, 34h | HIA_SYNCMODE, R/W, 35h | HIB_CONFIG, R/W, 36h |
|---|---|---|---|---|---|
| 7 | HXCTR_7 | HXCTR_15 | IA_VALID | IA_SXR3 | IB_VALID |
| 6 | HXCTR_6 | HXCTR_14 | IA_WIDE | IA_SXR2 | IB_WIDE |
| 5 | HXCTR_5 | HXCTR_13 | IA_ENQTAG | IA_SXR1 | IB_ENQTAG |
| 4 | HXCTR_4 | HXCTR_12 | IA_QFULL | IA_SXR0 | IB_QFULL |
| 3 | HXCTR_3 | HXCTR_11 | IA_ID3 | IA_OFST3 | IB_ID3 |
| 2 | HXCTR_2 | HXCTR_10 | IA_ID2 | IA_OFST2 | IB_ID2 |
| 1 | HXCTR_1 | HXCTR_9 | IA_ID1 | IA_OFST1 | IB_ID1 |
| 0 | HXCTR_0 | HXCTR_8 | IA_ID0 | IA_OFST0 | IB_ID0 |

| | HIB_SYNCMODE, R/W, 37h | HIC_CONFIG, R/W, 38h | HIC_SYNCMODE, R/W, 39h | HIAB_STAT, R/W, 3Ah | HIC_STAT, R/W, 3Bh |
|---|---|---|---|---|---|
| 7 | IB_SXR3 | IC_VALID | IC_SXR3 | | |
| 6 | IB_SXR2 | IC_WIDE | IC_SXR2 | | |
| 5 | IB_SXR1 | IC_ENQTAG | IC_SXR1 | IB_OC | |
| 4 | IB_SXR0 | IC_QFULL | IC_SXR0 | IB_QACK | |
| 3 | IB_OFST3 | IC_ID3 | IC_OFST3 | IB_TAGNOK | |
| 2 | IB_OFST2 | IC_ID2 | IC_OFST2 | IA_OC | IC_OC |
| 1 | IB_OFST1 | IC_ID1 | IC_OFST1 | IA_QACK | IC_QACT |
| 0 | IB_OFST0 | IC_ID0 | IC_OFST0 | IA_TAGNOK | IC_TAGNOK |

FIG. 5B-2

| | HESPLBA0, R/W, 3Ch | HESPLBA1, R/W, 3Dh | HESPLBA2, R/W, 3Eh | HESPLBA3, R/W, 3Fh | HSRDATA0, R/W, 40h |
|---|---|---|---|---|---|
| 7 | ESPLBA_7 | ESPLBA_15 | ESPLBA_23 | ESPLBA_31 | SOP3 |
| 6 | ESPLBA_6 | ESPLBA_14 | ESPLBA_22 | ESPLBA_30 | SOP2 |
| 5 | ESPLBA_5 | ESPLBA_13 | ESPLBA_21 | ESPLBA_29 | SOP1 |
| 4 | ESPLBA_4 | ESPLBA_12 | ESPLBA_20 | ESPLBA_28 | SOP0 |
| 3 | ESPLBA_3 | ESPLBA_11 | ESPLBA_19 | ESPLBA_27 | BCOND3 |
| 2 | ESPLBA_2 | ESPLBA_10 | ESPLBA_18 | ESPLBA_26 | BCOND2 |
| 1 | ESPLBA_1 | ESPLBA_9 | ESPLBA_17 | ESPLBA_25 | BCOND1 |
| 0 | ESPLBA_0 | ESPLBA_8 | ESPLBA_16 | ESPLBA_24 | BCOND0 |

| | HSRDATA1, R/W, 41h | HSRAMADR, W, 42h | HBACKPT, R, 43h | HRAOPT, R, 44h | HDFIPT, R, 45h |
|---|---|---|---|---|---|
| 7 | | | | | |
| 6 | | | | | |
| 5 | BADR5 | WRRAM | | | |
| 4 | BADR4 | SDRAM | BACKPT4 | RAOPT4 | DFIPT4 |
| 3 | BADR3 | SRAMADR3 | BACKPT3 | RAOPT3 | DFIPT3 |
| 2 | BADR2 | SRAMADR2 | BACKPT2 | RAOPT2 | DFIPT2 |
| 1 | BADR1 | SRAMADR1 | BACKPT1 | RAOPT1 | DFIPT1 |
| 0 | BADR0 | SRAMADR0 | BACKPT0 | RAOPT0 | DFIPT0 |

| | HEOBPT, R, 46h | HDFCNT, R, 47h | HLBACTR0, R/W, 48h | HLBACTR1, R/W, 49h |
|---|---|---|---|---|
| 7 | | | HLBACTR_7 | HLBACTR_15 |
| 6 | | | HLBACTR_6 | HLBACTR_14 |
| 5 | | | HLBACTR_5 | HLBACTR_13 |
| 4 | EOBPT4 | DFCNT4 | HLBACTR_4 | HLBACTR_12 |
| 3 | EOBPT3 | DFCNT3 | HLBACTR_3 | HLBACTR_11 |
| 2 | EOBPT2 | DFCNT2 | HLBACTR_2 | HLBACTR_10 |
| 1 | EOBPT1 | DFCNT1 | HLBACTR_1 | HLBACTR_9 |
| 0 | EOBPT0 | DFCNT0 | HLBACTR_0 | HLBACTR_8 |

KEY TO FIG. 5B

| FIG. 5B-1 | FIG. 5B-2 |
|---|---|

FIG. 6A

| Label | Addr. | Branch Address | Sequencer Operation Code | Branch Condition | Comment |
|---|---|---|---|---|---|
| | 00h | STOP | NOP | BRCH | |
| | 01h | STOP | RCV_IDTAG | BRCH | |
| | 02h | STOP | RCV_CMD | BRCH | |
| | 03h | STOP | XFR_DATA | BRCH | |
| | 04h | STOP | SND_CHK | BRCH | |
| | 05h | STOP | RCV_MSG | BRCH | |
| | 06h | STOP | SND_MSG | BRCH | |
| | 07h | STOP | SND_SDP | BRCH | |
| | 08h | STOP | SND_DIS | BRCH | |
| | 09h | STOP | SND_STS | BRCH | |
| | 0Ah | STOP | SND_IDTAG | BRCH | |
| | 0Bh | STOP | SND_GS | BRCH | |
| | 0Ch | STOP | SND_CC | BRCH | |
| | 0Dh | STOP | RSELO | BRCH | |
| | 0Eh | STOP | RSELONTHR | BRCH | |
| | 0Fh | | (reserved) | | |
| IDCMD | 10h | IDCMD | NOP | B_CFLOCK_S | Start Receive ID and Command Sequence |
| | 11h | STOP | RCV_IDTAG | B_QFULL | |
| | 12h | CMDISC | RCV_CMD | B_XIP | |
| | 13h | XFR | NOP | B_AUTO | |
| | 14h | STOP | NOP | B_NNORMDISC | |
| | 15h | IDCMD | SND_DIS | BRCH | |
| CMDISC | 16h | STOP | NOP | B_NNORMDISC | |
| | 17h | RECON | SND_DIS | B_XCONT | |
| | 18h | IDCMD | NOP | BRCH | |
| XFR | 19h | XEND | XFR_DATA | B_XDONE | Start Transfer Sequence |

|  | | | | |
|---|---|---|---|---|
| | 1Ah | STOP | NOP | D_NDISCXFR |
| | 1Bh | | SND_SDP | |
| | 1Ch | | SND_DIS | |
| RECON | 1Dh | IDCMD | RSELONTHR | B_SELIN | Start Reconnect Sequence |
| | 1Eh | XFR | SND_IDTAG | BRCH |
| XEND | 1Fh | GS | NOP | B_CCE |
| | 20h | STOP | NOP | B_NDISCST |
| DIS | 21h | IDCMD | SND_DIS | BRCH |
| RSELMSG | 22h | IDCMD | RSELO | B_SELIN | Start Reselect Message Sequence |
| | 23h | | SND_MSG | |
| GS | 24h | STOP | NOP | B_TAGNOK | Start Good Status and CC Sequence |
| | 25h | CCEND | SND_GS | BRCH |
| STS | 26h | | SND_STS | | Start Status and CC Sequence |
| CCEND | 27h | IDCMD | SND_CC | BRCH |
| SDP | 28h | DIS | SND_SDP | BRCH | Start Save Data Pointer and Disconnect Sequence |
| | 29h-2Eh | | | | Reserved ROM locations |
| | 2Fh | | | | Reserved as STOP address |
| | 30h-3Fh | | | | Sequencer RAM locations |

Contents of Sequencer Memory

FIG. 6B

KEY TO FIG. 6

| FIG. 6A |
|---|
| FIG. 6B |

Note:
HALTSEQ = not ((TARG and not SLRSLI) or NOP_RSELO)
LASTINS = STEP or MPSTOP or BRANCHTOSTOP Sequencer State Diagram

State Diagram For S_ins Instruction State Machine
for Receive Identify/Queue Tag (RCV_IDTAG) Operation

State Diagram For S_ins Instruction State Machine
for Receive Command (RCV_CMD) Operation

State Diagram For S_ins Instruction State Machine
for Transfer Data (XFR_DATA) Operation

State Diagram For S_ins Instruction State Machine
Send Check Status (SND_CHK), Send SDP Message (SND_SDP),
Send Disconnect Message (SND_DIS), Send Good Status (SND_GS) and Send
Command Complete (SND_CC) Operations

State Diagram For S_ins Instruction State Machine
for Receive Message (RCV_MSG) Operation

State Diagram For S_ins Instruction State Machine
for Send Message (SND_MSG) Operation

State Diagram For S_ins Instruction State Machine
for Send Status (SND_STS) Operation

State Diagram For S_ins Instruction State Machine
for Send Identify/Queue Tag (SND_IDTAG) Operation

State Diagram For S_ins Instruction State Machine
for Reselect Out (RSELO) and Reselect Out On Threshold (RSELONTHR) Operations

State Diagram For S_ins Instruction State Machine
for No Operation (NOP)

Contents of Six-Byte CDB

| Byte\Bit | 7 | 6 | 5 | 4 | 3 | 2 | 1 | 0 |
|---|---|---|---|---|---|---|---|---|
| CDB0 | CDBGROUP[2:0] = 0 | | | CMDCODE[4:0] | | | | |
| CDB1 | CLUN[2:0] | | | LBA[20:16] | | | | |
| CDB2 | LBA[15:8] | | | | | | | |
| CDB3 | LBA[7:0] | | | | | | | |
| CDB4 | XFRLEN[7:0] | | | | | | | |
| CDB5 | CONTR[7:0] | | | | | | | |

FIG. 10A
(PRIOR ART)

CFIFO Mapping for Six-Byte CDB

| Byte\Bit | 7 | 6 | 5 | 4 | 3 | 2 | 1 | 0 |
|---|---|---|---|---|---|---|---|---|
| CFIFO0 | X | | | | | | | |
| CFIFO1 | X | | | | | | | |
| CFIFO2 | X | | | | | | | |
| CFIFO3 | CDBGROUP[2:0] = 0 | | | CMDCODE[4:0] | | | | |
| CFIFO4 | CLUN[2:0] | | | 0 | | | | |
| CFIFO5 | 0 | | | | | | | |
| CFIFO6 | 0 | | | LBA[20:16] | | | | |
| CFIFO7 | LBA[15:8] | | | | | | | |
| CFIFO8 | LBA[7:0] | | | | | | | |
| CFIFO9 | 0 | | | | | | | |
| CFIFOA | 0 | | | | | | | |
| CFIFOB | 0 | | | | | | | T8 |
| CFIFOC | XFRLEN[7:0] | | | | | | | |
| CFIFOD | 0 | | | | | | | |
| CFIFOE | CONTR[7:0] | | | | | | | |
| CFIFOF | 0 | | | NOID | | IID(3:0) | | |

FIG. 10B

Contents of Ten-Byte CDB

| Byte\Bit | 7 | 6 | 5 | 4 | 3 | 2 | 1 | 0 |
|---|---|---|---|---|---|---|---|---|
| CDB0 | CDBGROUP[2:0] = 1 or 2 | | | CMDCODE[4:0] | | | | |
| CDB1 | CLUN[2:0] | | | CRES1_[4:0] | | | | |
| CDB2 | LBA[31:24] | | | | | | | |
| CDB3 | LBA[23:16] | | | | | | | |
| CDB4 | LBA[15:8] | | | | | | | |
| CDB5 | LBA[7:0] | | | | | | | |
| CDB6 | CRES2_[7:0] | | | | | | | |
| CDB7 | XFRLEN[15:8] | | | | | | | |
| CDB8 | XFRLEN[7:0] | | | | | | | |
| CDB9 | CONTR[7:0] | | | | | | | |

FIG. 11A
(PRIOR ART)

CFIFO Mapping for Ten-Byte CDB

| Byte\Bit | 7 | 6 | 5 | 4 | 3 | 2 | 1 | 0 |
|---|---|---|---|---|---|---|---|---|
| CFIFO0 | X | | | | | | | |
| CFIFO1 | X | | | | | | | |
| CFIFO2 | X | | | | | | | |
| CFIFO3 | CDBGROUP[2:0] = 1 or 2 | | | CMDCODE[4:0] | | | | |
| CFIFO4 | CLUN[2:0] | | | CRES1_[4:0] | | | | |
| CFIFO5 | LBA[31:24] | | | | | | | |
| CFIFO6 | LBA[23:16] | | | | | | | |
| CFIFO7 | LBA[15:8] | | | | | | | |
| CFIFO8 | LBA[7:0] | | | | | | | |
| CFIFO9 | 0 | | | | | | | |
| CFIFOA | 0 | | | | | | | |
| CFIFOB | XFRLEN[15:8] | | | | | | | |
| CFIFOC | XFRLEN[7:0] | | | | | | | |
| CFIFOD | CRES2_[7:0] | | | | | | | |
| CFIFOE | CONTR[7:0] | | | | | | | |
| CFIFOF | 0 | | | NOID | IID(3:0) | | | |

FIG. 11B

Contents of Twelve-Byte CDB

| Byte\Bit | 7 | 6 | 5 | 4 | 3 | 2 | 1 | 0 |
|---|---|---|---|---|---|---|---|---|
| CDB0 | CDBGROUP[2:0] = 5 | | | CMDCODE[4:0] | | | | |
| CDB1 | CLUN[2:0] | | | CRES1_[4:0] | | | | |
| CDB2 | LBA[31:24] | | | | | | | |
| CDB3 | LBA[23:16] | | | | | | | |
| CDB4 | LBA[15:8] | | | | | | | |
| CDB5 | LBA[7:0] | | | | | | | |
| CDB6 | XFRLEN[31:24] | | | | | | | |
| CDB7 | XFRLEN[23:16] | | | | | | | |
| CDB8 | XFRLEN[15:8] | | | | | | | |
| CDB9 | XFRLEN[7:0] | | | | | | | |
| CDBA | CRES2_[7:0] | | | | | | | |
| CDBB | CONTR[7:0] | | | | | | | |

FIG. 12A
(PRIOR ART)

CFIFO Mapping for Twelve-Byte CDB

| Byte\Bit | 7 | 6 | 5 | 4 | 3 | 2 | 1 | 0 |
|---|---|---|---|---|---|---|---|---|
| CFIFO0 | X | | | | | | | |
| CFIFO1 | X | | | | | | | |
| CFIFO2 | X | | | | | | | |
| CFIFO3 | CDBGROUP[2:0] = 5 | | | CMDCODE[4:0] | | | | |
| CFIFO4 | CLUN[2:0] | | | CRES1_[4:0] | | | | |
| CFIFO5 | LBA[31:24] | | | | | | | |
| CFIFO6 | LBA[23:16] | | | | | | | |
| CFIFO7 | LBA[15:8] | | | | | | | |
| CFIFO8 | LBA[7:0] | | | | | | | |
| CFIFO9 | XFRLEN[31:24] | | | | | | | |
| CFIFOA | XFRLEN[23:16] | | | | | | | |
| CFIFOB | XFRLEN[15:8] | | | | | | | |
| CFIFOC | XFRLEN[7:0] | | | | | | | |
| CFIFOD | CRES2_[7:0] | | | | | | | |
| CFIFOE | CONTR[7:0] | | | | | | | |
| CFIFOF | 0 | | | NOID | | IID(3:0) | | |

FIG. 12B

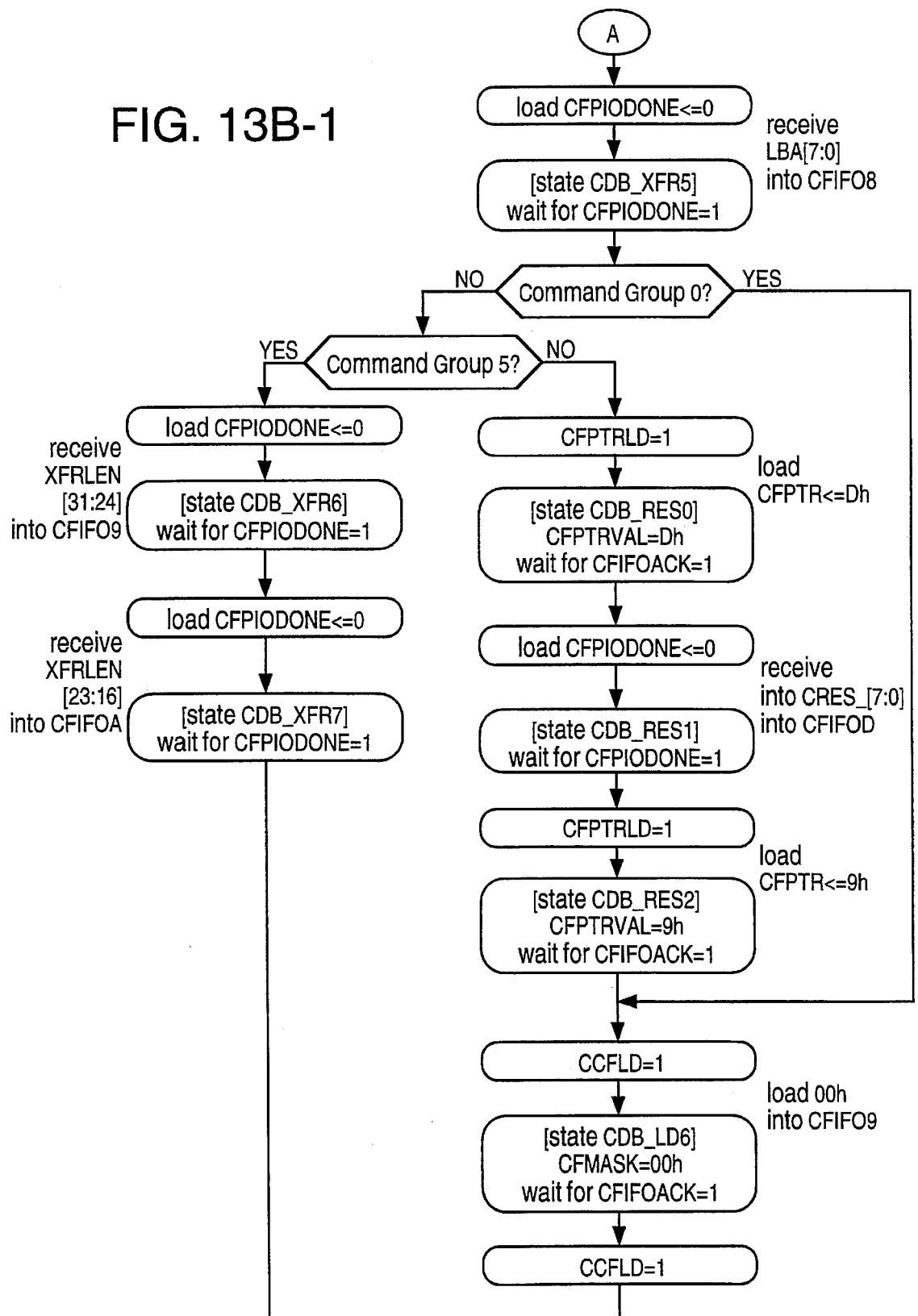
FIG. 13B-1 CDB Parsing State Machine Operation (continued)

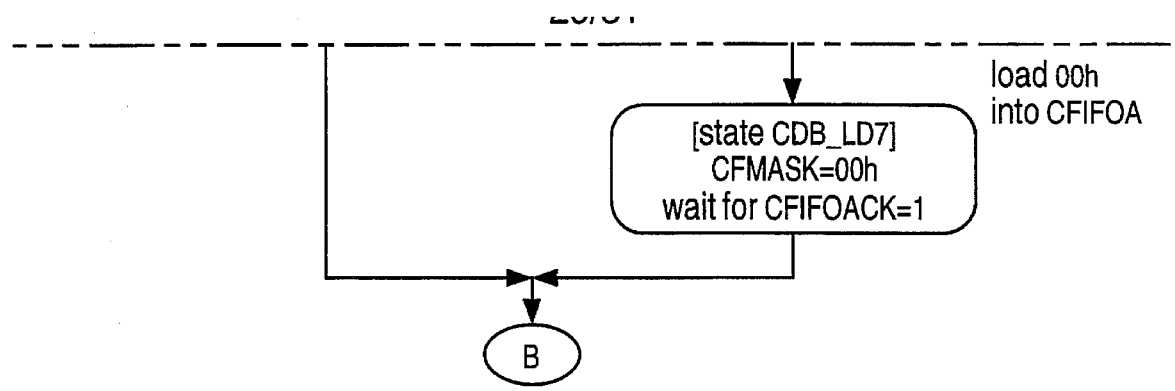
FIG. 13B-2
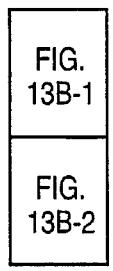
KEY TO FIG. 13B
| FIG. 13B-1 |
|---|
| FIG. 13B-2 |

CDB Parsing State Machine Operation (continued)

5,504,868

SCSI COMMAND DESCRIPTOR BLOCK PARSING STATE MACHINE

CROSS REFERENCE TO MICROFICHE APPENDICES

Microfiche Appendix A, which is a part of the present disclosure, comprises 1 sheet of microfiche having a total of 89 frames. Microfiche Appendix A is a specification for a SCSI interface portion of a disk controller integrated circuit.

Microfiche Appendix B, which is a part of the present disclosure, comprises 1 sheet of microfiche having a total of 83 frames. Microfiche Appendix B is a specification for a SCSI sequencer block disposed within a SCSI interface portion of a disk controller integrated circuit. Part of the SCSI sequencer block is described in VHDL hardware description language source code and part is described by schematics. Microfiche Appendix B also includes schematics generated from the VHDL source code by logic synthesis software.

Microfiche Appendix C, which is a part of the present disclosure, comprises 1 sheet of microfiche having a total of 45 frames. Microfiche Appendix C is a specification for SCSI command descriptor block parsing hardware disposed within a SCSI interface block of a disk controller integrated circuit. Part of the SCSI command descriptor block parsing hardware is described in VHDL hardware description language source code and part is described by schematics. Microfiche Appendix C also includes schematics generated from the VHDL source code by logic synthesis software.

Microfiche Appendix D, which is a part of the present disclosure, comprises 1 sheet of microfiche having a total of 8 frames. Microfiche Appendix D is VHDL hardware description language source code of an embodiment of a "receive ID tag instruction state machine" and of an embodiment of a "send ID tag instruction state machine".

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights.

FIELD OF THE INVENTION

This invention relates to SCSI bus interfaces. More particularly, the invention relates to parsing of SCSI command descriptor blocks by hardware on a hard disk controller integrated circuit.

BACKGROUND INFORMATION

The Small Computer System Interface (SCSI or commonly called the "SCSI bus") is a popular device independent parallel bus. The SCSI bus can, for example, be used to removably connect multiple devices including hard disk drives, printers and other input/output peripheral devices to a host computer. For background, the reader is referred to "Fast Track To SCSI", Integrated Circuits Division of Fujitsu Microelectronics, Inc., published by Prentice Hall (1991), the SCSI-1 specification, and the SCSI-2 specification (documents X3.131 and X3T9.2 of the American National Standards Institute).

FIG. 1 (PRIOR ART) is a simplified block diagram illustrating one possible SCSI bus configuration. Both an initiator device 1 as well as a target device 2 are shown coupled to a SCSI bus 3. SCSI bus 3 comprises nine data conductors (eight for data and one for parity), nine control conductors, and other power and ground conductors. Devices 1 and 2 are coupled in parallel to the bus conductors, corresponding SCSI terminals of each device being coupled to the same corresponding bus conductor. Typically each conductor is resistively coupled to a voltage of an inactive state. To "assert" a signal onto a conductor, a device must drive to conductor to a voltage of an active state against the resistive coupling of the conductor. If not driven, a conductor will return to its inactive state.

Each device connected to a SCSI bus is classified as either an initiator or as a target. Initiator devices cause target devices on the bus to perform commands whereas target devices perform commands for the initiators. There can be multiple initiators and multiple targets on a SCSI bus.

Target device 2 in FIG. 1 is a hard disk computer peripheral device comprising a hard disk controller integrated circuit 4, a buffer memory 5, a first microprocessor 6, a second microprocessor 7, a hard disk 8, head electronics and actuator 9, and read channel electronics 10. If, for example, initiator 1 were to attempt to write data to disk 8, then the initiator 1 would output a write command onto the SCSI bus 3. The SCSI bus is initially in a "bus free phase" in which the SCSI bus is idle. To initiate the write command, initiator 1 asserts a BSY signal onto an OR-tied BSY control conductor of SCSI bus 3, thereby causing the bus to enter an "arbitration bus phase". During the arbitration bus phase, each initiator arbitrates for the bus with the other initiators by asserting the appropriate one of the data conductors of the SCSI bus corresponding with a SCSI identifier (SCSI ID) unique to the initiator. Because each SCSI ID has an assigned priority, the initiator with the highest priority, in this case initiator 1, determines that it has the highest priority by detecting the other data conductors. The highest priority initiator, here initiator 1, asserts a select signal SEL onto a SEL conductor of the bus to indicate to other initiators and targets that the bus is busy.

After winning control of the bus through arbitration, initiator 1 selects the target device of interest, in this case target 2, in a "selection bus phase". Initiator 1 asserts its SCSI ID as well as the SCSI ID of the target onto the data conductors of the SCSI bus. When the target detects its SCSI ID on the data conductors, the target responds by asserting the BSY signal onto the OR-tied BSY conductor. The bus free, arbitration, and selection bus phases are control phases.

With initiator 1 now in control of SCSI bus 3, and with target 2 identified as the target, target 2 requests a SCSI command from initiator 1 in a "command bus phase". The SCSI bus has a C/D signal and an associated C/D conductor for distinguishing control and data on the bus. The C/D signal being asserted indicates control information is being passed over the bus whereas the C/D signal being deasserted indicates data being passed over the bus. The SCSI bus also has an I/O signal and an associated I/O conductor for indicating the direction of flow of information across the bus. The I/O signal being asserted indicates information flow from target to initiator whereas the I/O signal being deasserted indicates information flow from initiator to target. Accordingly, the target asserts the C/D signal indicating control information and deasserts the I/O signal indicating information flow from initiator to target. Initiator 1 then responds by sending the command over the bus to target 2 byte by byte using two control conductors of the SCSI bus, the REQ and ACK conductors, for handshaking. Each SCSI command, called a SCSI command descriptor block (CDB), consists of multiple bytes, either six, ten or twelve bytes. The command contains information which includes a SCSI operation code indicating the type of command to be performed.

FIG. 2A (PRIOR ART) is a diagram illustrating the fields in the SCSI operation code byte of a SCSI command CDB. The first byte, byte 0, of all SCSI commands is a SCSI operation code. A group code of 0 indicates that the command is a six-byte command; a group code of 1 or 2 indicates that the command is a ten-byte command; and a group code of 5 indicates that the command is a twelve-byte command.

FIGS. 2B, 2C and 2D (PRIOR ART) are diagrams illustrating six-byte, ten-byte, and twelve-byte commands, respectively. The transfer length field, if required by the command specified by the command code of the SCSI operation code, specifies the number of blocks (or bytes) transferred upon execution of the command. Whether the transfer length information of the transfer length field is in bytes or blocks is determined by the type of command. If the command is a write command, the command descriptor block includes a logical block address (LBA) of the first block to be transferred as well as the number of blocks to be transferred during execution of the write command.

Hard disk controller integrated circuit 4 comprises a SCSI interface portion 11 for interfacing with the SCSI bus 3, a disk controller portion 12 for interfacing with the hard disk 8, and a buffer manager portion 13 for controlling a flow of data through buffer memory 5 between the SCSI interface portion 11 and disk controller portion 12. It is the SCSI interface portion 11 which receives commands from the SCSI bus 3.

For a write command, the read/write head of disk 8 must usually be moved in a seek operation to an appropriate location on disk where the data is to be written. Accordingly, microprocessor 7 is instructed to move the head to the correct location by microprocessor 6. While the seek operation is being carried out, data can be received from the initiator 1 over SCSI bus 3 for later writing to disk 8. SCSI interface portion 11 therefore configures the buffer manager portion 13 to store incoming data into buffer memory 5.

When the target 2 is ready to receive data, the target 2 deasserts the I/O signal and deasserts the C/D signal thereby causing the bus to enter a "data out phase". Initiator 1 then sends byte after byte of data to target 2 over the SCSI bus using the REQ and ACK signals for handshaking. Successive bytes of data are placed in buffer memory 5. When the seek operation is complete, the disk controller portion 12 begins writing data received from the buffer memory 5 to disk 8.

After, for example, all the data of the write command has been received into buffer memory 5, the target 2 may cause the bus to enter a "status bus phase" by asserting the C/D and I/O signals and by deasserting a signal MSG on an associated control conductor MSG. The target 2 then sends to initiator 1 a status byte indicating whether or not the command was executed without error.

If, for example, the write of information to disk 8 was successful, then target 2 may cause the bus to enter a "message in phase" by asserting the C/D, I/O and MSG signals. With the bus in the message in phase, target 2 may send initiator 1 a SCSI defined message. If, for example, a command complete message is sent, then initiator 1 will be able to examine the status byte after completion of the command. Target 2 releases SCSI bus 3 by releasing the BSY signal whereupon the SCSI bus reenters the bus free phase. Whereas the bus free, arbitration and selection phases are called control phases, the command, data, status and message phases are called information transfer phases.

In order to reduce the cost of a target SCSI hard disk drive peripheral, the first and second microprocessors 6 and 7 may be combined into a single microprocessor. Such a single microprocessor is, however, frequently interrupted to control SCSI bus operations. The response of the microprocessor to other tasks may therefore be undesirably slow. If, for example, a SCSI write command is to be sent to the target, then the microprocessor may be interrupted after the initiator 1 has selected the target. This interrupt allows the microprocessor to set up facilities in the SCSI interface to receive the command bytes. After the command bytes have been received into the SCSI interface (for example into a first-in-first-out memory), the microprocessor is again interrupted. This allows the microprocessor to interpret the meaning of the command bytes.

Because the same type of information may be contained in different ones of the bytes of six-byte, ten-byte and twelve-byte SCSI command descriptor blocks, the microprocessor may read the various bytes of the command descriptor block out of a first-in-first-out memory into which the bytes were initially written, determine what type of information is contained in each byte dependent upon whether the command descriptor block is a six-byte, ten-byte or twelve-byte command descriptor block, and then write selected bytes of the information into predetermined memory locations accessible by the microprocessor for future use.

If the command is determined to be a write command, then the microprocessor would configure the rest of the target including the buffer manager to accommodate the data to be transferred during subsequent execution of the command. Then after the data transfer is complete, the microprocessor is again interrupted by the hard disk controller integrated circuit to indicate that it is time to send the status byte and the command complete message byte to initiator 1. The microprocessor then can load the status byte and command complete message byte into a FIFO and enable an operation to shift to FIFO out, thereby placing the status byte and command complete message bytes onto the SCSI bus. After the placing of status and command complete message bytes onto the SCSI bus, the microprocessor is again interrupted alerting the microprocessor that the operation is completed.

Not only is the microprocessor burdened by the need to determine the locations of different types of information in different types of command descriptor blocks and the need to handle numerous interrupts in the execution of a command, but the microprocessor may also be interrupted in the event that more data is written to the disk drive peripheral than the disk drive peripheral has room to accommodate in its buffer memory. If, for example, the buffer memory 5 is full when additional data is to be received from the bus, then the microprocessor will be interrupted by the hard disk controller integrated circuit. This allows the microprocessor the opportunity to instruct the SCSI interface to disconnect itself from the SCSI bus so that the bus can be used to transfer information between other devices. Then, after the disk drive peripheral again has the ability to receive additional data from the initiator, the microprocessor is again interrupted so that the microprocessor can instruct the SCSI interface portion 11 to again arbitrate for the bus and to reselect the bus in a SCSI "reselection bus phase". Additional interrupts may therefore be involved in disconnecting from the bus and then reconnecting to the bus. Moreover, such disconnecting and reconnecting can occur multiple times when executing a single SCSI command leading to still more microprocessor interrupts. A hard disk controller integrated circuit is therefore desired which reduces microprocessor overhead in parsing command descriptor blocks and which reduces the number of microprocessor interrupts in a SCSI bus target when executing a SCSI command.

SUMMARY

An SCSI command descriptor block parsing state machine in accordance with an embodiment of the present invention writes information from corresponding field six-byte, ten-byte and twelve-byte SCSI command descriptor blocks into the same register of a set of registers. For example, bytes 4, 8 and 9 contain the low byte of the transfer length field of six-byte, ten-byte and twelve-byte command descriptor blocks, respectively, yet a command descriptor block parsing state machine in accordance with an embodiment of the present invention places the low byte of the transfer length field into the same single-byte register regardless of whether the command descriptor block is a six-byte, ten-byte or twelve-byte command descriptor block.

In some embodiments, a hard disk controller integrated circuit comprises a sequencer and a command descriptor block parsing state machine. The command descriptor block parsing state machine is a dedicated state machine which parses information from the various fields of incoming SCSI command descriptor blocks into predetermined corresponding registers in the set of registers. The sequencer then executes SCSI commands or parts of SCSI commands based on the contents of the set of registers as loaded by the command descriptor block parsing state machine. A microprocessor coupled to the hard disk controller integrated circuit can access the set of registers. In some embodiments, the set of registers is also operable as a first-in-first-out memory thereby enabling the microprocessor to load the contents of the registers with SCSI message bytes and to output those message bytes serially onto the SCSI bus.

BRIEF DESCRIPTION OF THE DRAWINGS

FIGS. 2A–2D (PRIOR ART) are diagrams illustrating formats of six-byte, ten-byte and twelve-byte SCSI command descriptor blocks.

FIGS. 5A and 5B are diagrams illustrating registers of the SCSI interface portion of FIG. 4.

FIG. 6 is a diagram illustrating sequencer instructions located in sequencer memory.

FIG. 10A (PRIOR ART) is a diagram illustrating the fields of a six-byte SCSI command descriptor block and FIG. 10B is a diagram showing where information from each of the fields is written into the sixteen-byte CFIFO.

FIG. 11A (PRIOR ART) is a diagram illustrating the fields of a ten-byte SCSI command descriptor block and FIG. 11B is a diagram showing where information from each of the fields is written into the sixteen-byte CFIFO.

FIG. 12A (PRIOR ART) is a diagram illustrating the fields of a twelve-byte SCSI command descriptor block and FIG. 12B is a diagram illustrating where information from each of the fields is written into the sixteen-byte CFIFO.

FIGS. 13A–13D are flowcharts illustrating a operation of a "CDB parsing state machine" in accordance with an embodiment of the present invention.

DETAILED DESCRIPTION OF THE PREFERRED EMBODIMENTS

Figure 1:
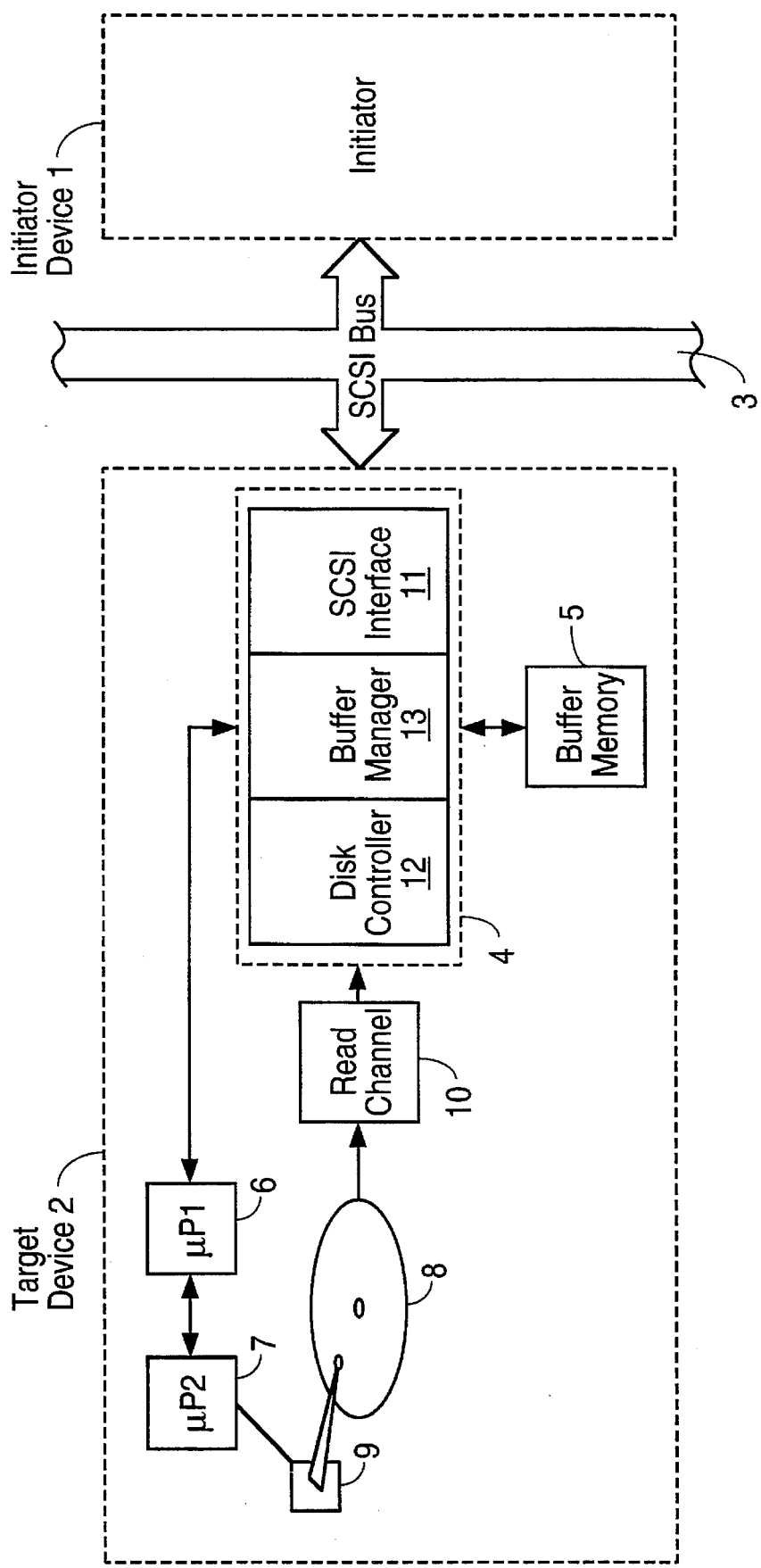
FIG. 1 (PRIOR ART) is a simplified diagram of an initiator device and a target device coupled to a SCSI bus.
Figure 3:
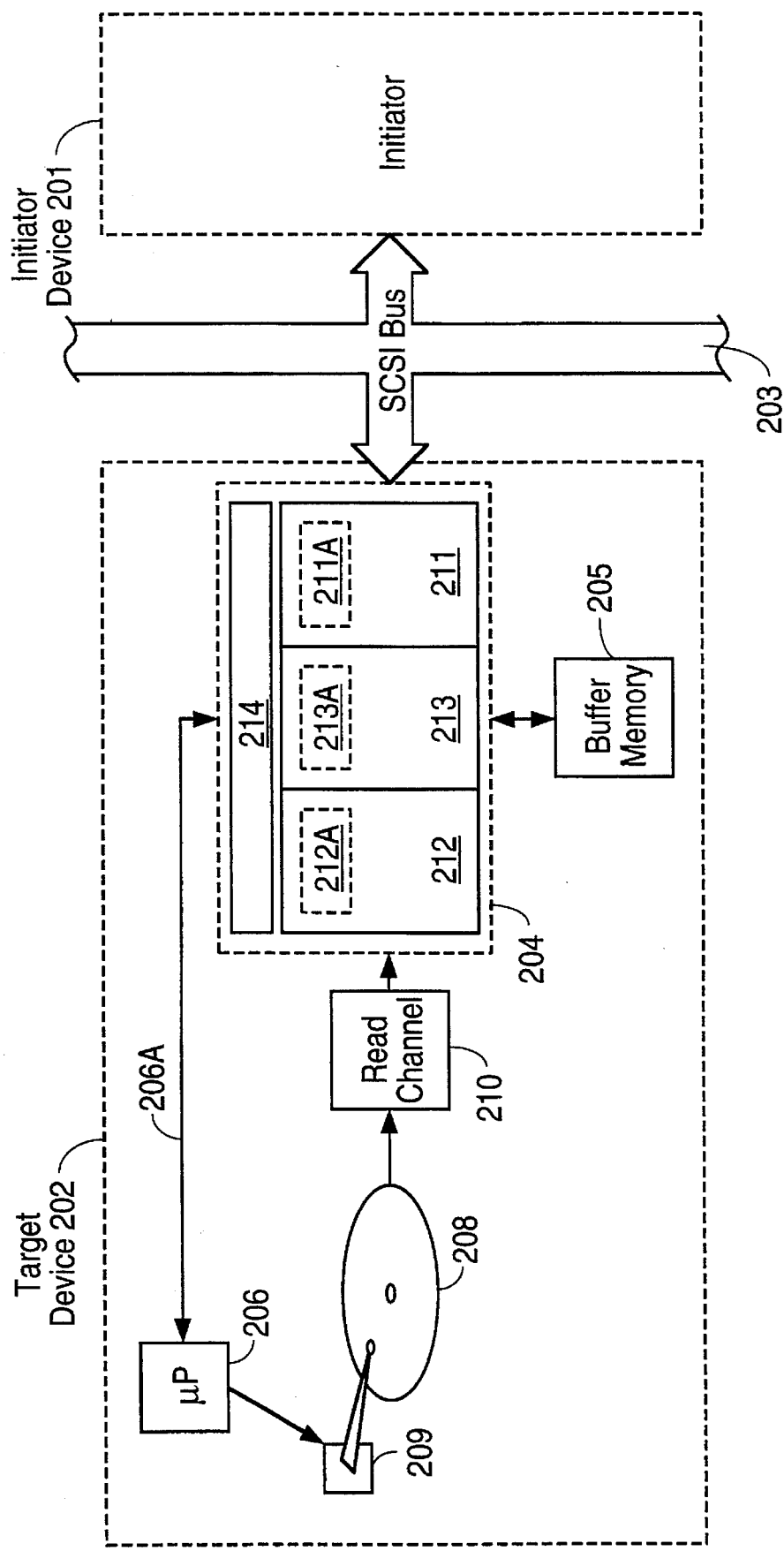
FIG. 3 is a simplified diagram of an initiator device and a target device coupled to a SCSI bus in accordance with an embodiment of the present invention.

FIG. 3 is a simplified block diagram illustrating an embodiment in accordance with the present invention. An initiator device 201 as well as a target device 202 are coupled to a SCSI bus 203. Target device 202 comprises a hard disk controller integrated circuit 204, a buffer memory 205, a microprocessor 206, a hard disk 208, head electronics and actuator 209, and read channel electronics 210. Hard disk controller integrated circuit 204 comprises a disk controller portion 212, a buffer manager portion 213, a SCSI interface portion 211, and a microprocessor interface portion 214. Each of the portions 211, 212 and 213 has a local microprocessor interface block 211A, 212A and 213A, respectively, for communication with the microprocessor interface portion 214. Although the hard disk controller integrated circuit 204 is illustrated directly coupled to the SCSI bus 203, circuitry such as external bus drivers may be disposed between the hard disk controller integrated circuit 204 and the SCSI bus 203 in some embodiments.

Figure 4:
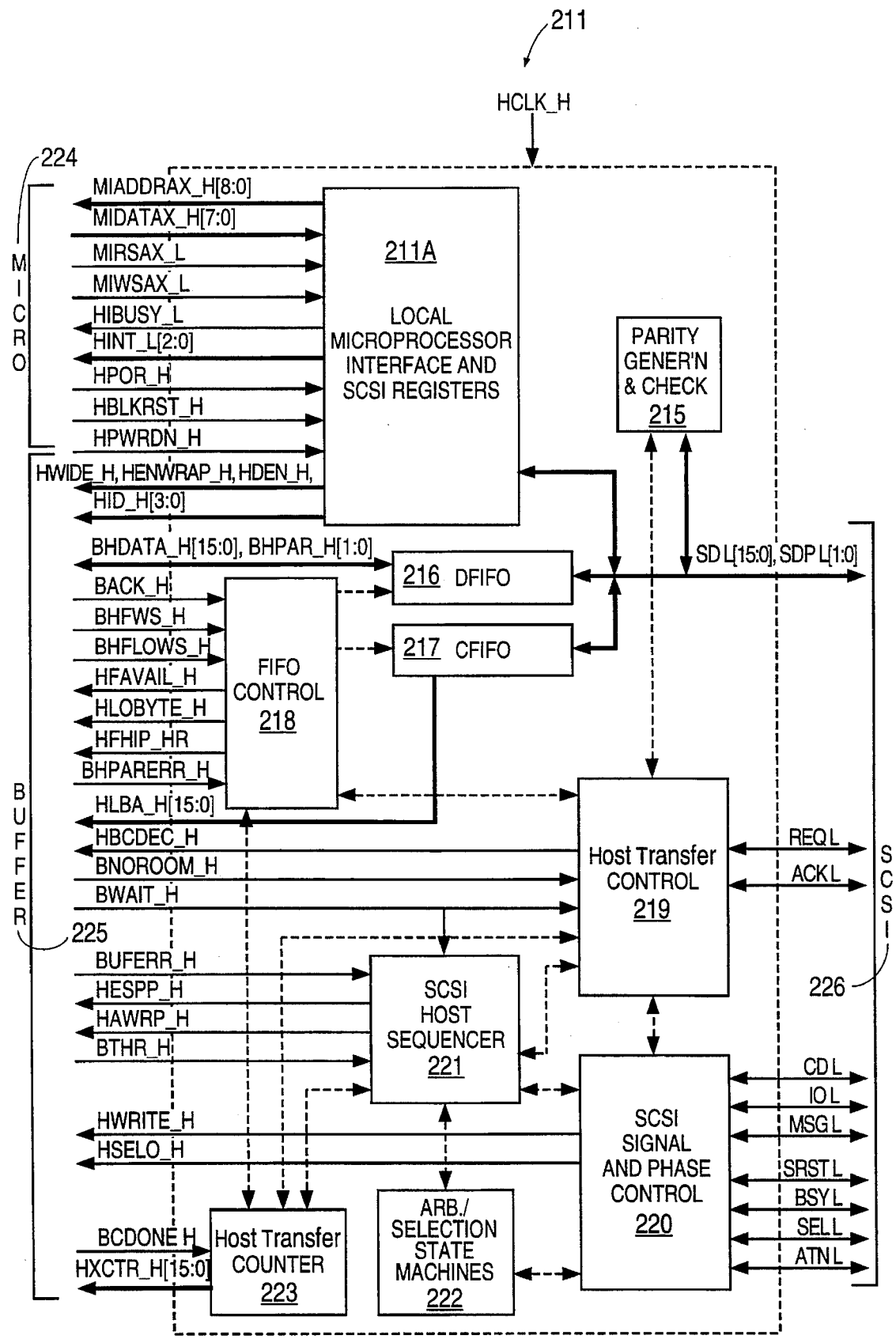
FIG. 4 is a simplified block diagram of a SCSI interface portion of a hard disk controller integrated circuit in accordance with an embodiment of the present invention.

FIG. 4 is a simplified block diagram of SCSI interface portion 211 of hard disk controller integrated circuit 204. SCSI interface portion 211 comprises local microprocessor interface and SCSI registers block 211A, a parity generation and check block 215, a data first-in-first-out memory (DFIFO) 216, a control first-in-first-out memory (CFIFO) 217, a first-in-first-out memory control block 218, a host transfer control block 219, a SCSI signal and phase control block 220, a sequencer block 221, an arbitration/selection state machines block 222, and a host transfer counter block 223. The signal conductors 224 designated MICRO in FIG. 4 couple the SCSI interface portion 211 to microprocessor 206 of the target device 202 via the microprocessor interface portion 214. The signal conductors 225 labelled BUFFER in FIG. 4 couple the SCSI interface portion 211 to buffer manager portion 213 of the disk controller integrated circuit 204. The signal conductors 226 designated SCSI in FIG. 4 couple the SCSI interface portion 211 to SCSI bus 203.

Local microprocessor interface and SCSI registers block 211A interfaces to all other blocks of the SCSI interface portion 211. The connections are not shown in FIG. 4 so as not to over-crowd the diagram. Microprocessor 206 can read or write numerous registers located in the local microprocessor interface block 211A via the microprocessor interface portion 214 of the disk controller integrated circuit 204.

DFIFO block 216 is a 16×18 first-in-first-out memory used to transfer data between SCSI bus 203 and buffer 205 as controlled by the buffer manager portion of the disk controller integrated circuit. The interface between DFIFO 216 and SCSI bus 203 is 9-bits wide for a narrow SCSI interface and is 18-bits wide for a wide SCSI interface.

CFIFO block 217 is a 16×8 register file used for transferring control bytes (command, status and/or message) to and from SCSI bus 203. It is organized as sixteen 8-bit registers. Each of the registers can be read or written independently of the others by microprocessor 206 via the HCFIFO0-HCFIFOF registers (21h-30h). When transferring bytes to the SCSI bus, the CFIFO usually functions as a normal FIFO with a FIFO count and a data pointer. The microprocessor 206 can access the FIFO count and the data pointer via registers HCFCNT (1Fh) and HCFPTR (20h), respectively.

FIFO control block 218 controls the CFIFO and DFIFO blocks by interfacing with the buffer manager portion 213 and by keeping track of the status of the two FIFOs. Host transfer control block 219 controls data transfer between SCSI bus 203 and the buffer manager portion 213 by controlling data transfer between SCSI bus 203 and the CFIFO block 217. The host transfer control block 219 handles the REQ/ACK handshaking of the SCSI protocol and controls transfer stops when there is inadequate room in buffer memory 205 for data of the command being executed. Host transfer counter 223 counts blocks of information transferred between SCSI bus 203 and buffer memory 205. Parity generation and check block 215 checks the parity of data received from SCSI bus 203 with the parity bit of the SCSI bus 203 and also generates parity bits when data is sent from CFIFO block 217 to the SCSI bus 203. During transfer from buffer memory 205 to SCSI bus 203, parity is received from the buffer memory 205 and is passed through the DFIFO 216 to the SCSI bus without being regenerated. SCSI signal and phase control block 220 handles miscellaneous control signals for interfacing to the SCSI bus. Arbitration and selection state machines block 222 controls the SCSI signal sequences for performing SCSI arbitration, selection and reselection as well as for responding to selection and reselection by other SCSI devices on the SCSI bus.

SCSI sequencer block 221 comprises a sequencer, a sequencer memory, an "instruction state machine", a "CDB parsing state machine", a "receive ID tag instruction state machine", and a "send ID tag instruction state machine". The sequencer and its associated state machines together execute SCSI sequences of sequencer instructions in target mode including automatically receiving an autoread or autowrite command from the SCSI bus and proceeding to transfer data without waiting for any communication from microprocessor 206.

FIGS. 5A–5B illustrate "registers" of the SCSI interface portion 211. Although some of the registers may actually involve counters or other digital circuitry, the counters or other digital circuitry are referred to as "registers" here because they can be accessed by microprocessor 206. An R indicates that the corresponding register can be read by microprocessor 206. A W indicates that the corresponding register can be written by microprocessor 206. A R/W indicates that the register can both be read and written by microprocessor 206. The address at which each of the registers can be accessed by microprocessor 206 is also given. Individual bits in the registers are given descriptive labels.

Microprocessor 206 starts the sequencer sequencing through a series of instructions located in sequencer memory by initializing a SCSI sequencer address register HSADR (01h) with the address of the first instruction of the instruction sequence and then setting a sequencer run S_RUN bit in a register HSEQEN (02h). After the S_RUN bit has been set, the sequencer proceeds through sequencer memory from instruction to instruction until a stop address STOP (2Fh) is reached. Some sequencer instructions have branch conditions. If the branch condition of a sequencer instruction is true, then the sequencer will branch to the instruction address specified in the branch address field of the instruction. The sequencer can therefore be made to stop by branching to the stop address. When the sequencer stops, the sequencer done bit SEQDONE of sequencer status register HSEQSTAT (03h) is set and the sequencer address register HSADR contains the address of the last instruction executed before reaching the STOP address.

FIG. 6 is a diagram illustrating sequencer instructions located in sequencer memory. Locations 00h-0Fh contain single-instruction sequences which allow a single instruction to be executed. Locations 00h-00Fh are locations, the contents of which are user-definable but are fixed at time of manufacture of the hard disk controller integrated circuit. After the instruction located at the starting address is executed, the sequencer stops. Locations 10h-2Eh, on the other hand, contain multi-instruction sequences. Locations 10h-2Eh are ROM locations the contents of which are fixed as illustrated in FIG. 6. Location 2Fh, another ROM location, is the STOP address to which multi-instruction sequences may branch to stop. Locations 30h-3Fh are RAM locations, the contents of which can be written by microprocessor 206. Accordingly, user-defined sequences can be written into the RAM locations of the sequencer memory by the microprocessor 206 and then executed later by the sequencer.

Table 1 below sets forth a summary explanation of each of the sequencer operation codes of the instructions executable by the sequencer. Appendices A and B are to be consulted for additional details.

TABLE 1

| VALUE | LABEL | DESCRIPTION |
|---|---|---|
| 0 | NOP | No operation |
| 1 | RCV_IDTAG | Receive Identify and Queue Tag: If attention is asserted (ATNILAT=1 of register HSTAT2), switch to "message out bus phase" and receive a byte from the SCSI bus into the CFIFO0 register. If the byte is a valid Identify message byte, set the identify received status bit (IDEN of register HCTL1). If attention is still asserted, disconnection is enabled, and receiving of the queue tag message is enabled (ENQTAG=1 in register HSTAT0). Two queue tage message bytes are received into the CFIFO1 and CFIFO2 |

TABLE 1-continued

| VALUE | LABEL | DESCRIPTION |
|---|---|---|
| | | registers. If there is an outstanding unqueued command (Ix_OC=1 and Ix_QACT=0), receiving of the queue tag message is disabled. If there are one or more outstanding queued commands (Ix_OC=1 and Ix_QACT=1) and attention is negated after the Identify byte, the instruction is halted. |
| 2 | RCV_CMD | Receive Command: Switch to "command bus phase". Receive the first byte of the command from the SCSI bus into the CFIFO3 register. Check the group code in bits 7:5 of that byte. If the group code is 0, 1, 2, or 5, then receive the remaining command bytes into the CFIFO, and the instruction is done. For any other group code, set the unexpected data status bit (UNEXDATA=1 in register HERRSTAT) and halt the sequencer. |
| 3 | XFR_DATA | Transfer Data: If the host transfer counter (registers HXCT0,1) has not expired, and if a write command (WROP=1 in register HCTL0), then switch to "data out bus phase", else switch to "data in bus phase". Enable buffer DMA transfer and wait for buffer DMA Done (bit BDMA DONE in register HXFRSTAT), then wait until BWAIT_H=0 from the buffer manager, and the instruction is done if BUFERR H=0 from the buffer manager. |
| 4 | SND_CHK | Send Check Condition Status: Load the check condition status byte (02h) into the host data out register 0 (18h), switch to "status bus phase", send the message byte to the SCSI bus in register PIO mode, instruction is done. |
| 5 | RCV_MSG | Receive Message: If attention is negated, the instruction is done. If attention is asserted, switch to "message out bus phase" and receive message bytes froom the SCSI bus into CFIFO until attention is negated, at which time the instruction is done. If CFIFO becomes full and attention is still on, set unexpected attention status (UNEXATN bit of register HERRSTAT) and halt the sequencer. |
| 6 | SND_MSG | Send Message: Switch to "message in bus phase", flush out the bytes in the CFIFO to the SCSI bus, instruction is done. |
| 7 | SND_SDP | Send Save Data Pointer Message: Load SDP message byte (02h) into host data out register 0 (HDOR0), switch to "message in bus phase", send the message byte to the SCSI bus in register PIO mode, instruction is done. |
| 8 | SND_DIS | Send Disconnect Message: Load disconnect message byte (04h) into host data out register 0 (HDOR0), switch to "message in bus phase", send the message byte to the SCSI bus in register PIO mode, go bus free, instruction is done. |
| 9 | SND_STS | Send Status: Switch to "status bus phase", send one byte ot the SCSI bus from the CFIFO, instruction is done. |
| A | SND_IDTAG | Send Identify and Queue Tag: If the active identify received status bit (bit ACT_IDEN in register HACT_IDQ) is reset, then instruction is done. Else, switch to "message in bus phase", load a value of 80h+ACT_UN (i.e. identify message with the logical unit number for the active command) into register HDOR0, and send the message bye to the SCSI bus in register PIO mode. If active queue tag received status bit (bit ACT_QTAG in register HACT_IDQ) is reset, then instruction is done. Else, load a value of 20h (i.e. first queue tag byte) into register HDOR0, and send the byte to the SCSI bus, then the load the contents of register HACT_QT2 (second queue tag byte) into HDOR0 and send one more byte to the SCSI bus, instruction is done. |
| B | SND_GS | Send Good Status: Load good status byte (00h) into host data out register 0 (HDOR0), switch to "status bus phase", send the message byte to the SCSI bus in register PIO mode, instruction is done. |
| C | SND_CC | Send Command Complete Message: Lod CC message byte (00h) into host data out register 0 (HDOR0), |

TABLE 1-continued

| VALUE | LABEL | DESCRIPTION |
|---|---|---|
| | | switch to "message in bus phase", send the message byte to the SCSI bus in register PIO mode, go bus free, instructio is done. |
| D | RSELO | Reselect Out: Attempt to reselect the initiator specified in the DESTID[3:0] bits in the HIDOUT register. The instruction is done when the hard disk controller integrated circuit is connected to the SCSI bus in Target mode, i.e. either the reselection completed or the hard disk controller integrated circuit was selected by an initiator. |
| E | RSELONTHR | Reselect Out On Threshold: Attempt to reselect the initiator specified in the DESTID[3:0] bits in the HIDOUT register when the buffer threshold signal from the buffer manager portion (BTHR_H) is asserted. The instruction is done when the hard disk controller integrated circuit is connected to the SCSI bus in target mode, i.e. either the reselection completed or the hard disk controller integrated circuit was selected by an initiator. |
| F | reserved | |

Table 1

Table 2 below sets forth a summary explanation of each of the branch conditions which may be present in an instruction executable by the sequencer. Many of the branch conditions of Table 2 are dependent upon the state of one or more register bits located in the SCSI interface block.

TABLE 2

| VALUE | LABEL | DESCRIPTION |
|---|---|---|
| 0 | NB | No branch. |
| 1 | BRCH | Unconditional Branch |
| 2 | B_CFLOCK_S | Branch if CFIFO access is locked (bit CFLOCK S=1 in register HCTL1). |
| 3 | B_QFULL | Branch if queue is full (bit QFULL=1 in register HSTAT1). |
| 4 | B_XIP | Branch if a data transfer is in progress (bit XIP=1 in register HCTL1). |
| 5 | B_AUTO | Branch if current command is an autowrite or an ESP command (bit AWR=1 or bit ESP=1 in register HSTAT0). |
| 6 | B_NDISCXFR | Branch if disconnection on data transfer is not allowed (DP=0 in register HCTL1 or DISCXFR=0 in register HCTL0). |
| 7 | B_NNORMDISC | Branch if disconnection is not allowed (DP=0 in register HCTL1), or if both of the following conditions are false:<br>a. The current command is a normal read (NORMRD=1 in register HSTAT0) and disconnect on normal read is allowed (DISCNRD=1 in register HCTL0).<br>b. The current command is a normal write (NORMWR=1 iin register HSTAT0) and disconnect on normal write is allowed (DISCNWR=1 in register HCTL0). |
| 8 | B_XCONT | Branch if transfer continue is enabled (XCONT=1 in register HCTL0). |
| 9 | B_XDONE | Branch if data transfer is done (XDONE=1 in register HSTAT1). |
| A | B_CCE | Branch if sending of command complete is enabled (WROP=1 in register HCTL1 and ENCCWR=1 in register HCTL2, or WROP=0 and ENCCRD=1 in register HCTL2). |
| B | B_NDISCST | Branch if disconnect on status is disabled (DISCST=0 in register HCTL0) or disconnection is not allowed (DP=0 in register HCTL1). |
| C | B_SELIN | Branch if a select has occurred (SELIN=1 in registesr HSTAT2). |
| D | B_TAGNOK | Branch if queue tag is not OK (TAGNOK=1). |
| E | B_GPB0 | Branch if general purpose branch 0 bit (GPB0 in register HCTL2) is set. |
| F | B_GPB1 | Branch if general purpose branch 1 bit (GPB1 in |

TABLE 2-continued

| VALUE | LABEL | DESCRIPTION |
|---|---|---|
| | | register HCTL2) is set. |

Table 2

Operation of the sequencer block 221 of the SCSI interface portion of the disk drive integrated circuit is explained by reference to an execution of an autowrite command. FIGS. 7A–7D are a flow chart illustrating sequencer instruction execution by the sequencer. In the flowchart of FIGS. 7A–7D, a rectangular box with a rounded corners indicates a sequencer operation code of a sequencer instruction whereas a following box with pointed corners indicates a branch condition of the sequencer instruction. A sequencer instruction may be represented only as one box with rounded corners where the sequencer instruction has no branch condition. Conversely, a sequencer instruction may be represented only as one box having pointed corners where the sequencer operation code is a NOP (no operation) but where the sequencer instruction does have a branch condition.

Figures 1, 7A:
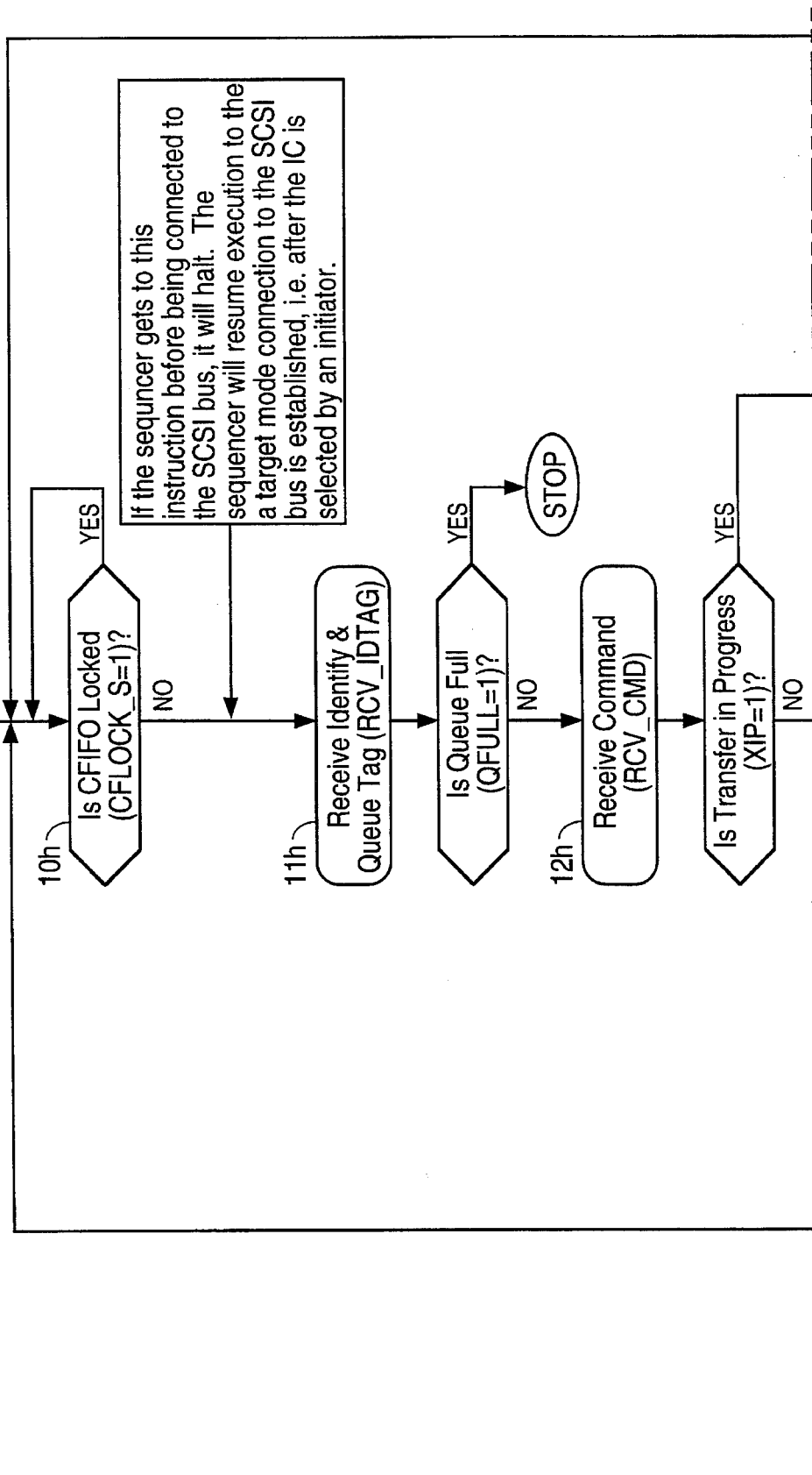
FIGS. 7A–7D are flow diagrams illustrating operation of a sequencer in accordance with an embodiment of the present invention.

As indicated by the label IDCMD in FIG. 7A, instruction flow begins by microprocessor 206 loading register HSADR with the address 10h and by setting the S_RUN bit in register HSEQEN to start the sequencer. The branch condition of the first sequencer instruction executed results in the sequencer of sequencer block 221 waiting until CFIFO block 217 is no longer locked. If CFIFO block 217 is unlocked as determined by bit CFLOCK_S of register HCTL1 being a "0", then process flow proceeds to location 11h. A state machine in the arbitration/selection state machines block 222 interacts with the SCSI signal and phase control block 220 to respond to initiator 201 for selection. When target 202 is selected by initiator 201, the state machine within the arbitration/selection state machines block 220 loads bits OTHERID3 through OTHERID0 of register HOTHERID (14h) with the SCSI ID of the initiator that made the selection. As indicated in FIG. 7A, the sequencer will halt if instruction execution reaches this location before target 202 is connected to the SCSI bus. The sequencer resumes instruction execution after a target mode connection to the SCSI bus is established (i.e. after target 202 is selected by initiator 201).

Next, the receive identify and queue tag instruction at location 11h is executed by the sequencer. The sequencer initiates operation of the "instruction state machine" which in turn initiates operation of the "receive ID tag instruction state machine" of sequencer block 221. This state machine causes an identify message byte containing a logical unit number to be loaded into CFIFO0 of CFIFO block 217. If the command contains the optional two-byte queue tag message of the SCSI protocol, such queue tag bytes are loaded into CFIFOa and CFIFO2 of CFIFO 217 block and the QTAG2 bit of register HSTAT1 is set after loading of the second queue tag byte. The attention signal ATN on conductor ATN of the SCSI is controlled by the initiator to indicate to the target whether queue tag bytes are coming or whether the first byte of the command descriptor block is coming. As indicated in FIG. 7A, if the queue is full, a branch to STOP address 2Fh is performed, otherwise instruction flow proceeds to location 12h. Queuing is explained in more detail below.

Location 12h contains the receive command instruction. The sequencer initiates operation of the "instruction state machine" which in turn initiates operation of the "CDB parsing state machine" of the sequencer block 221. The CDB parsing state machine parses the command, loads information from different fields of the command into corresponding other CFIFO locations and then generates an interrupt to the microprocessor to notify the microprocessor 206 that a new command has been received and parsed. If a data transfer is already in progress, instruction flow proceeds to location 16h as illustrated, otherwise instruction flow proceeds to location 13h.

The interrupt is generated onto conductor 206A (see FIG. 3) as follows. Status register HSEQSTAT (03h) contains a CDBDONE bit. The CDBDONE bit is set by the "CDB parsing state machine" when the command has been parsed. Each bit of the HSEQSTAT status register has an associated mask bit in interrupt enable register HSEQINTEN (04h). If any unmasked bit in HSEQSTAT is set, then an interrupt condition will be signalled to microprocessor interface block 214 via interrupt conductor HINT_L0. Microprocessor interface block 214 uses this interrupt signal from the local microprocessor interface block 211A to generate an interrupt to microprocessor 206 on interrupt conductor 206A. Accordingly, the setting of an unmasked status bit in the HSEQSTAT register results in a microprocessor interrupt.

At location 13h, execution of the NOP with the B_AUTO branch condition results in the sequencer determining whether the command in the CFIFO requires microprocessor intervention or whether the command in the CFIFO should be executed without microprocessor intervention. In order for the SCSI interface portion 211 to determine that it should carry out the command without microprocessor intervention, the command must be either an autowrite command as indicated by an autowrite bit AWR in register HSTAT0 being set or an ESP command as indicated by an ESP bit in register HSTAT0 being set. In the presently described scenario, the command is an autowrite command. Three conditions must be met in order for the sequencer to automatically branch to the data transfer phase in the presently described scenario.

First, an enable autowrite (ENAWR) bit of register HCTL0 (0Bh) must be set indicating that autowrite commands are enabled. This bit can be written by microprocessor 206 beforehand to enable or disable the SCSI interface portion 211 from performing autowrites.

Second, a bit NORMWR of register HSTAT0 (0Ch) must be set indicating that the command is a predetermined type of write command, for example, a "normal write command." There are no "normal write commands" in the twelve-byte command format. Accordingly, if the command received comprises twelve bytes, the command is not a normal write. For a six-byte command, a normal write command is a write command for which the control byte (byte five of FIG. 2B) is all zeros. The setting of bits in the control byte may indicate that numerous commands are to be linked together, thereby precluding the command from being classified a normal write. For a ten-byte command, a normal write command is a write command for which the control byte (byte nine of FIG. 2C) is all zeros as in the case of a six-byte command, but where the two reserved fields of bytes one and six also contain all zeros. A bit in one of these reserved fields being set may, for example, indicate a special write command such as a disable on caching write command. A command with a nonzero bit in the reserved fields is therefore determined not to be a normal write. Accordingly, bit NORMWR of register HSTAT0 (0Ch) will have been set if the decode of the command bytes in the CFIFO indicates a normal write, if a valid identify message byte was received, and if the mentioned command and message bytes were received for an initiator having a valid initiator SCSI ID.

Third, the bit ESP in register HSTAT0 (0Ch) must be zero. If all three conditions are met (if NORMWR=1, if ENAWR=1 and if ESP=0), then an autowrite bit AWR in register HSTAT0 is set.

Figures 2, 7A:
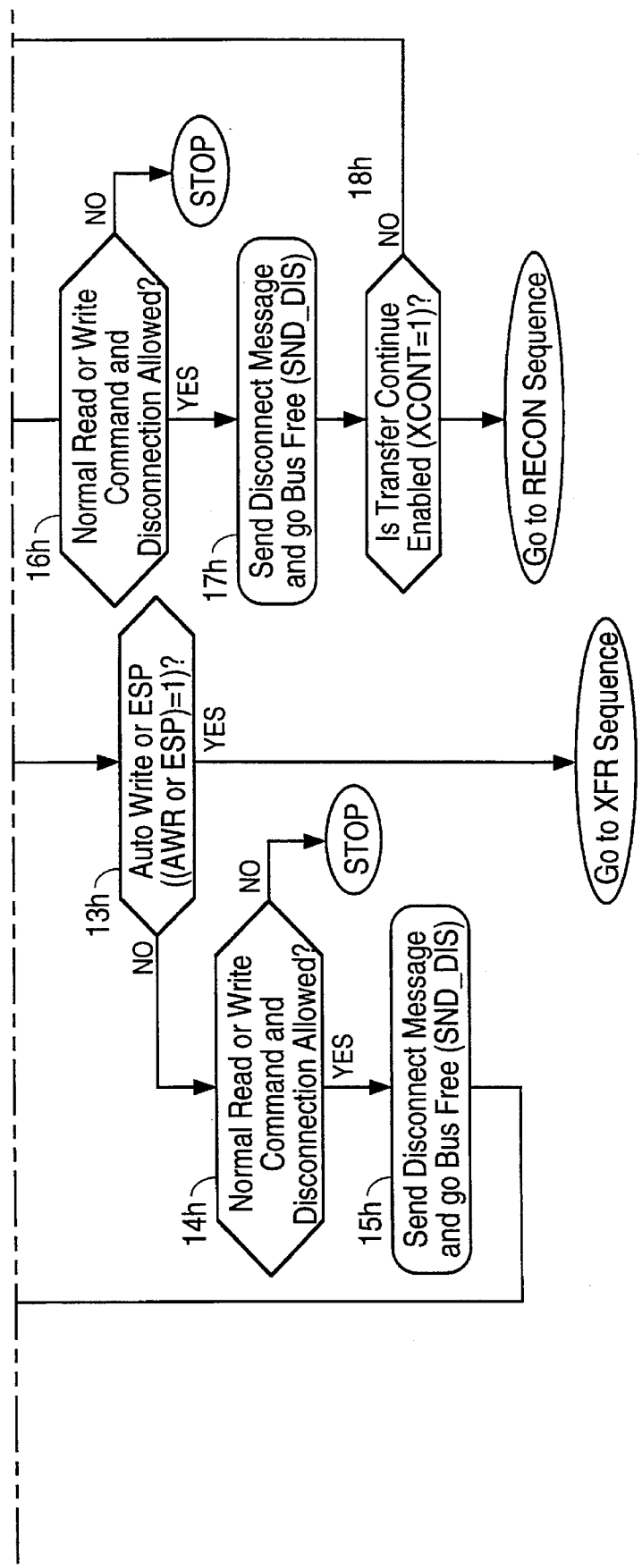

In the presently described scenario, the command is an autowrite command, thereby resulting in bit AWR being set and the branch condition of the NOP at location 13$h$ being true. Because the branch condition is true, a plurality of registers are loaded as follows. As indicated in FIGS. 2B–2D, the received command contains a field called the "transfer length field". This field contains a number indicating the number of blocks (or bytes) of data to be transferred by execution of the command. Upon the branch condition of location 13$h$ being true, a counter in the host transfer counter block 223 is loaded with transfer length information contained in the transfer length field of the received command. This counter is called a register (specifically register HXCTR0,1) because it can be read and written by microprocessor 206. Furthermore, a register called the active identify and queue tag register (register HACT_IDQ) is loaded with the SCSI ID of the initiator which issued the command. A register called the active queue tag byte 2 register (register HACT_QT2) is loaded with queue tag information from any queue tags received by the target. The initiator identification information and the queue tag information is supplied to the registers HACT_IDQ and HACT_QT2 from CFIFO block 217. Four bits DESTID3 through DESTID0 of the register HIDOUT (13$h$) are also loaded with the SCSI ID of the destination which was previously stored in four bits OTHERID3 through OTHERID0 of register HOTHERID (14$h$). A counter (denoted register HLBACTR0,1) is loaded with the least significant sixteen bits of the logical block address of the first block of data to the transferred. The logical block address of the first block of data to be transferred is, for example, indicated by bytes 2–5 of a ten-byte command. Counter HLBACTR0,1 is called a register because it can be read and written by the microprocessor. During the transfer of data, HLBACTR0,1 is incremented upon the transfer of each block (or byte) of data so that HLBACTR0,1 contains the least significant sixteen bits of the logic block address of the present data block. A bit WROP in host control register HCTL1 is also loaded with a "1" if the command is a write command and is loaded with a "0" if the command is a read command. The registers and bits HACT_IDQ, HACT_QT2, DESTID3-0, HLBACTR0,1 and WROP are all located in the microprocessor interface and SCSI registers block 214.

Figures 1, 7B:
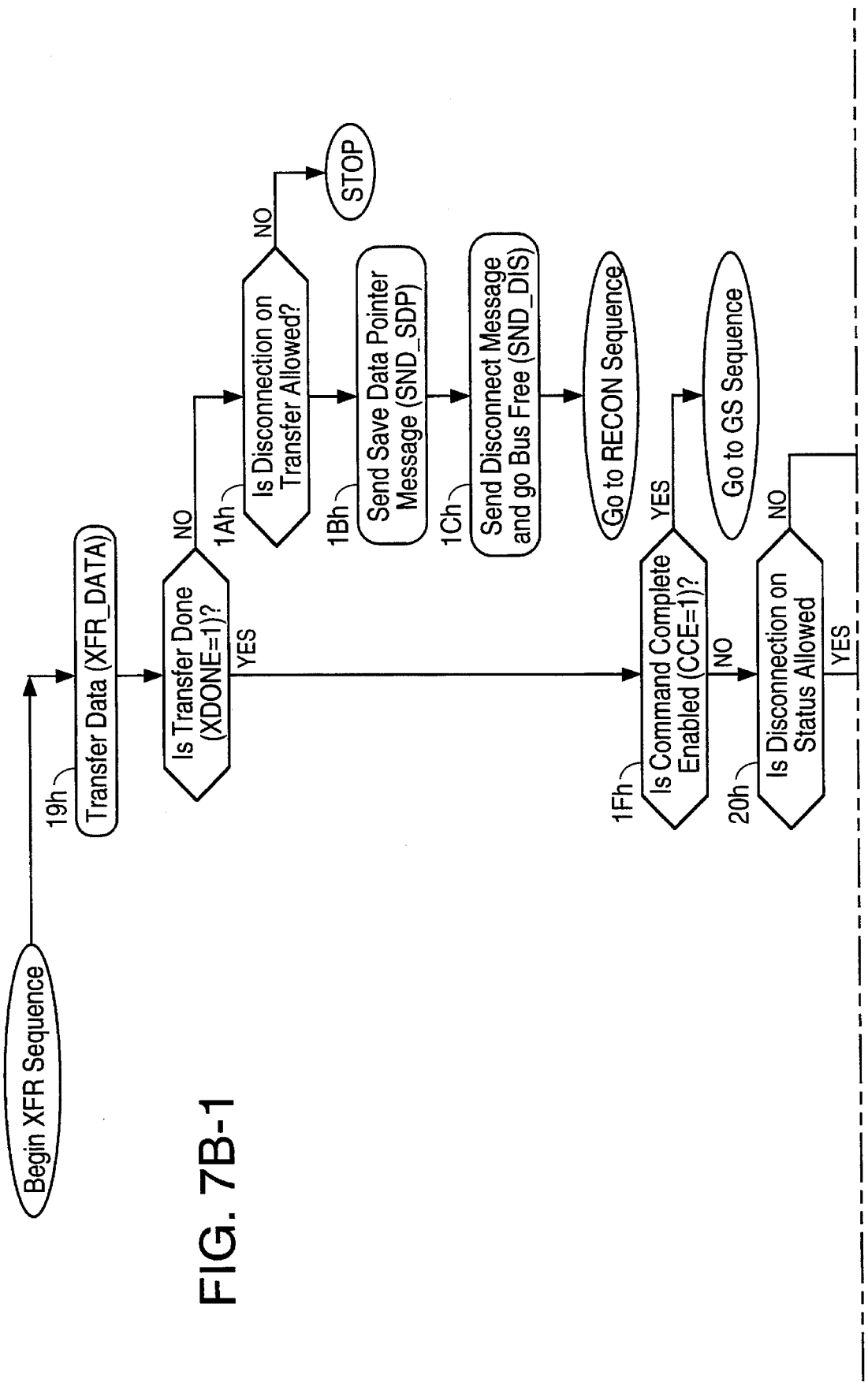
Figures 2, 7B:
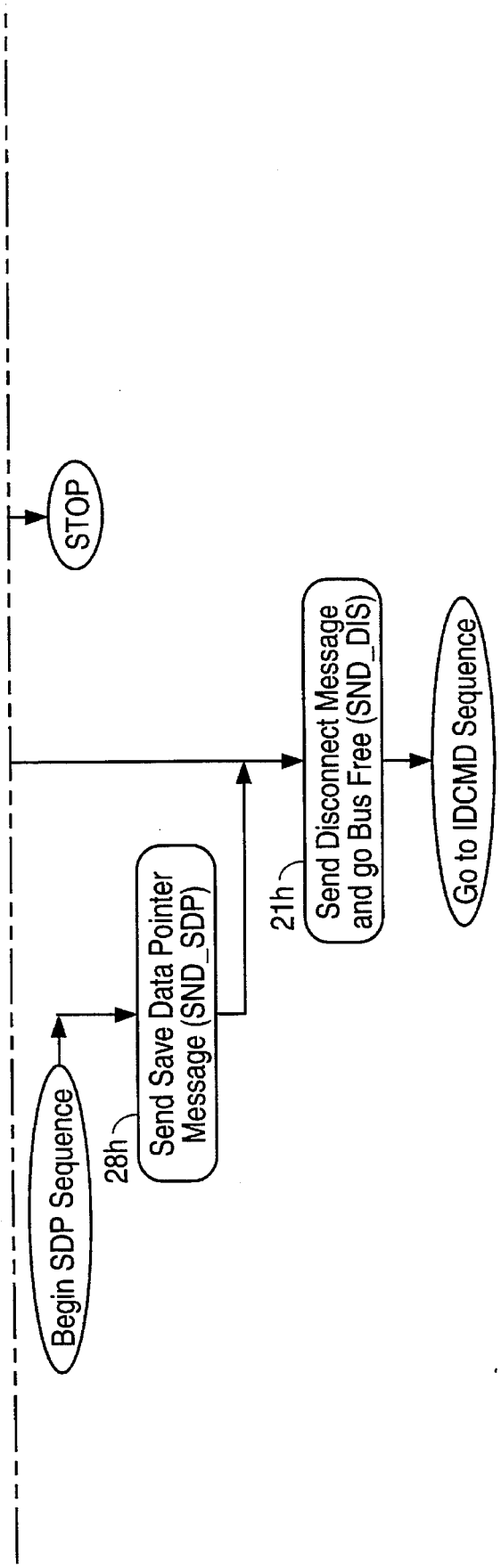

After the loading of these registers and bits, sequencer execution automatically proceeds to the data transfer sequence (XFR sequence) of FIG. 7B without waiting for a microprocessor communication. The transfer data instruction located at location 19$h$ is therefore executed. As successive blocks of data are transferred from SCSI bus 203 to the buffer manager portion 213, the host transfer counter HXCTR0,1 disposed in block 223 is decremented and the logical block address in HLBACTR0,1 in block 214 is incremented.

If, for example, the buffer memory 205 cannot accommodate all the data of the autowrite command as fast as the data can be supplied from the SCSI bus 203, then the buffer manager portion 213 signals that no room exists in the buffer by asserting a BNOROOM_H signal (see FIG. 4) to the host transfer control block 214 of the SCSI interface portion. As indicated in FIG. 7B, process flow proceeds to location 1A$h$ where the sequencer checks to determine if microprocessor 206 has allowed the target to disconnect from the SCSI bus. If the target is allowed to disconnect, then the sequencer executes the instructions at locations 1B$h$ and 1C$h$ to cause two messages required by the SCSI protocol prior to a disconnect to be output onto the SCSI bus 203. The "save data pointer" SCSI message is output onto the SCSI bus by execution of the instruction at location 1B$h$ and the "disconnect" SCSI message is output onto the SCSI bus by execution of the instruction at location 1C$h$. The sequencer then activates the SCSI signal and phase control block 220 to place SCSI bus 203 in the bus free state. With target 202 now disconnected from SCSI bus 203, the SCSI bus 203 is now available for other data transfers to occur, for example between another initiator and another target.

Figure 7C:
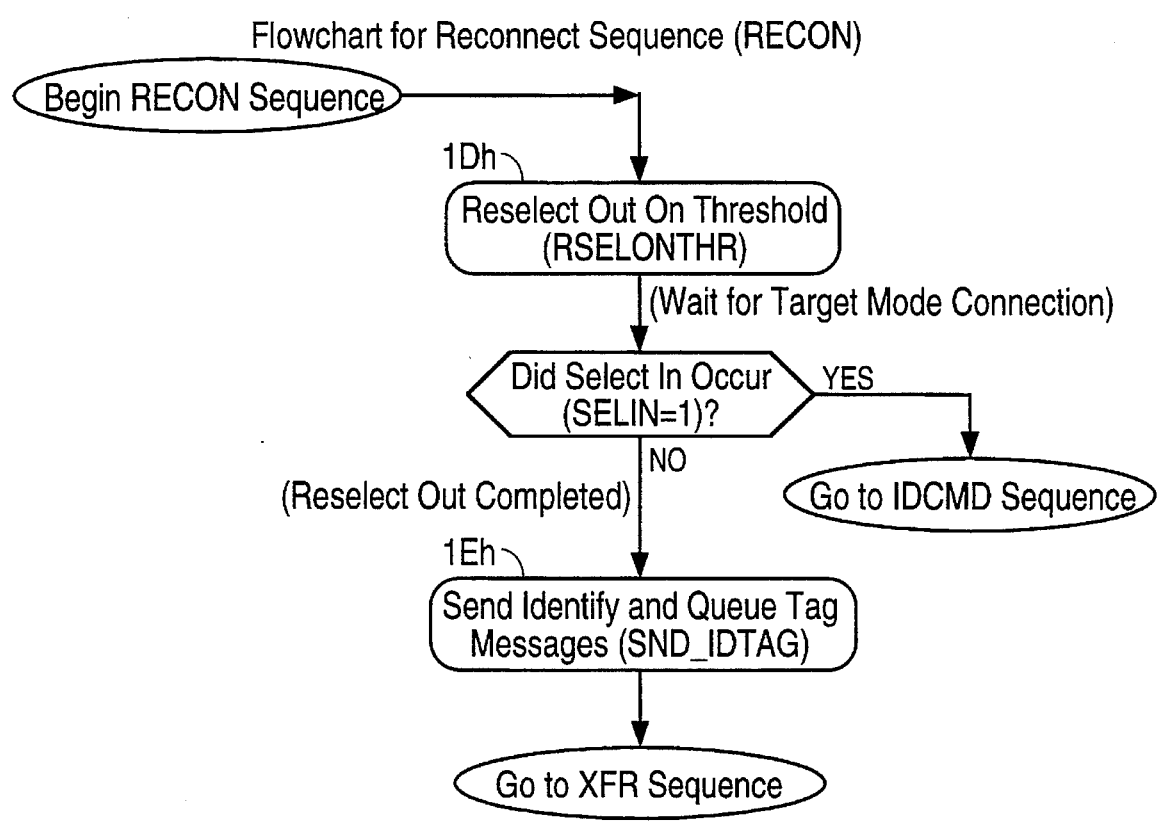

FIG. 7C illustrates a later determination of whether to reconnect to SCSI bus 203 at location 1D$h$. Based on a threshold condition as indicated by signal BTHR_H (see FIG. 4) received from the buffer manager portion 213, a determination is made by the sequencer as to whether to initiate reconnection to the SCSI bus. If a determination is made to reconnect, the SCSI ID of the initiator must be sent out onto the SCSI bus in order to allow the initiator of the interrupted command to be reconnected with the target. Accordingly, the contents of bits DESTID3 through DESTID0 which were previously stored in register HIDOUT on the autowrite branch are output onto the SCSI bus. When the initiator recognizes its SCSI ID on the SCSI bus and responds by selecting the target, the instruction at location 1E$h$ is executed to send the SCSI identify and queue tag information of the interrupted command which were previously stored in the HACT_IDQ and HACT_QT2 registers back to the initiator (A "sequencer state machine" initiates operation of an "instruction state machine" which in turn initiates operation of a "send ID tag instruction state machine" which actually sends the SCSI identify and queue tag information). Process control then proceeds back to the data transfer sequence of FIG. 7B.

Figure 7D:
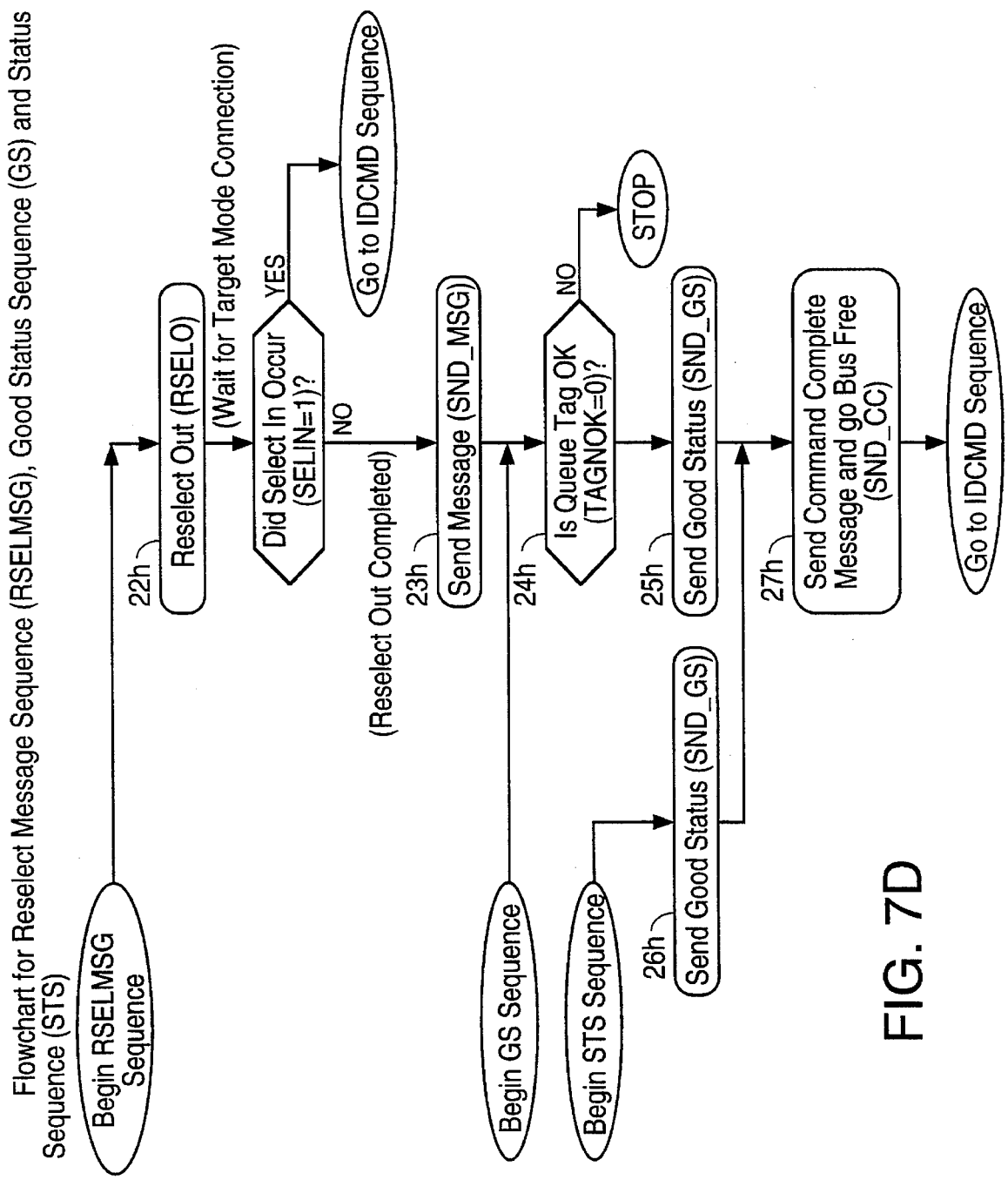

If after the data transfer is completed, the sequencer determines that the SCSI interface portion 211 is enabled to complete the command, then the branch instruction of location 1F$h$ causes process flow to proceed to the good status (GS) sequence of FIG. 7D. The determination of whether the SCSI interface portion 211 is enabled to complete the command is made with reference to the B CCE branch condition of Table 2.

The instruction at location 24h facilitates a test for a valid queue tag. In SCSI-2 it is possible for an initiator to send many commands (each having a queue ID tag) to a target in a burst of commands without waiting for each command to be executed. For example, an initiator may send a first read command, followed by a second read command, followed by a third read command. If the data to be read by the first command is located on an outer track of a disk, the data to be read by the second command is located on an inner track of the disk and the data to be read by the third command is located on a center track of the disk, the target may reorder the commands first command-third command-second command for execution so that the head of the disk seeks from the outer track, to the center track, to the inner track, thereby speeding the seek operations and reducing disk drive response time. Multiple commands are therefore "queued"

in the target provided that no two outstanding commands received from a single initiator have the same queue ID tag. If a received command for a given initiator is determined to have a unique queue tag with respect to all outstanding queue tags for that initiator, then the received command is said to have been validated.

Accordingly, after CFIFO 217 is initially loaded with the queue tag information for the received command, microprocessor 206 receives the CDBDONE interrupt and then reads the queue tag. Meanwhile, the sequencer has proceeded to enter the data transfer phase without waiting. At this point the SCSI ID of the initiator that selected the target is present in register HOTHERID (14h).

To enable tag checking, there are three sets (A, B and C) of three bits stored in the registers HIAB_STAT (3Ah) and HIC_STAT (3Bh), one set for each of three initiators. The SCSI ID of the three initiators A, B and C are available in bits 3 through 0 in registers at locations 34h, 36h and 38h. The SCSI ID of the initiator of the received command is compared with the SCSI Ids of the three initiators A, B and C. If there is a match, then the queue tag of the recently received command may be invalid and is checked.

If an outstanding command exists for the matching initiator, then the outstanding command bit OC (in register 3Ah or 3Bh) for the matching initiator will be set. If another command is then received for an initiator the OC bit of which is set, then the TAGNOK bit (in register 3Ah or 3Bh) for that initiator bit is set. The value of the TAGNOK bit of the relevant initiator is also the value of a global TAGNOK bit in register HSTAT1 (0Eh). Once a TAGNOK bit is set, the TAGNOK bit must be reset by microprocessor 206, thereby providing an interlock mechanism preventing the sequencer from sending status and command complete bytes prematurely until the microprocessor has had a chance to validate the queue tag. If the microprocessor 206 determines that the received command has a valid queue tag, then the microprocessor resets the TAGNOK bit for the appropriate initiator so that the global TAGNOK bit in register HSTAT1 is reset to a "0". Otherwise, the global TAGNOK bit remains a "1".

In SCSI-2, commands without queue tags cannot be queued. The QACT bit of each of the three sets of bits in registers HIAB_STAT and HIC_STAT indicates that the SCSI ID of the received command matches the SCSI ID of the corresponding initiator but that the received command does not have a queue tag.

If when the sequencer reaches location 24h (see FIG. 7D) the global TAGNOK bit of register HSTAT1 (0Eh) is cleared in the present scenario indicating that the queue tag was validated by the microprocessor or there is only one outstanding command from this initiator and therefore the tag is valid, then the send good status instruction is executed by the sequencer at location 25h. (The send good status instruction is a relatively simple operation and therefore is carried out by the "instruction state machine".) After a send command complete message is output onto the SCSI bus by execution of the instruction at location 27h, the SCSI signal and phase control block 220 is activated to cause the SCSI bus to go into the bus free phase and the command complete occurred bit CCOCR is set in register HSEQSTAT (03h) of the microprocessor interface and SCSI registers block 211A in order to generate an interrupt signal onto conductor HINT_L0. As a result, microprocessor 206 is alerted via microprocessor interface portion 214 that the sequencer has completed execution of the SCSI command.

If in another scenario the microprocessor has not yet cleared the TAGNOK bit when the sequencer reaches location 24h, then the sequencer will disconnect from the SCSI bus. When disconnected, the SCSI bus can be used by other devices on the bus. The microprocessor can then later set up the SCSI interface portion to reconnect to the SCSI bus and send the status byte and the command complete message byte.

Not only does the SCSI interface portion 211 of the disk controller integrated circuit 204 proceed from the command bus phase to the data transfer bus phase without waiting for a communication from the microprocessor for commands determined to be autowrite commands, but the SCSI interface portion 211 also proceeds from the command bus phase to the data transfer bus phase without waiting for a communication from the microprocessor for commands called "ESP commands". Note that execution of the B_AUTO command at location 13h in FIG. 7A also causes the sequence to proceed to the data transfer sequencer (denoted XFR sequence in FIG. 7A) if the ESP bit of register HSTAT0 (0Ch) is set. In a command determined to be an ESP command, the logical block address of the command matches an expected logical block address which was previously loaded by microprocessor 206 into four registers HESPLBA0, HESPLBA1, HESPLBA2 and HESPLBA3 (3Ch-3Fh).

For purposes of the specific embodiment, the term "autotransfer" encompasses both autowrite commands and autoread commands. The ordinary autowrite command described above is one type of autowrite command and the ESP read command is one type of autoread command. The ESP write command is a specialized type of autowrite command.

Assume that initiator 201 is reading a sequence of blocks of data at sequential logical block addresses from target 202 using a corresponding sequence of SCSI read commands. If it were possible for the target 202 to determine that the next read command is the next of the sequence of read commands, then the appropriate data could be loaded into buffer memory 205 and the buffer manager portion 213 could be set up to provide that data before the read command is received. As a result, response time of the target 202 to the anticipated read command would be decreased when the anticipated read command is actually received because the buffer manager portion 213 would be configured and ready beforehand.

In accordance with an embodiment of the present invention, microprocessor 206 determines that the next command from a given initiator is likely to be a command having a given logical block address. Microprocessor 206 loads the anticipated logical block address into the four registers HESPLBA0 (3Ch), HESPLBA1 (3Dh), HESPLBA2 (3CEh) and HESPLBA3 (3Fh) so that the buffer manager is configured for data at the anticipated logical block address. The received command is then tested to determine if it is an ESP command. If the command is determined to be an ESP command, then the ESP bit in register HSTAT0 (0Ch) is set thereby enabling the sequencer to branch to the data transfer sequence at location 13h in the flow of FIG. 7A.

The current command is determined to be an ESP command and the ESP bit is set if: 1) ESP commands are enabled as determined by bit ENESP being set in register HCTL0 (0Bh); 2) the logical block address of the received command in registers CFIFO5 through CFIFO8 matches the anticipated logical block address in registers HESPLBA3 through HESPLBA0; and 3) the command is either a normal write command when ESP writes are enabled by bit ESPRD in register HCTL0 being cleared, or the command is a normal read command when ESP reads are enabled by bit ESPRD in register HCTL0 being set. Microprocessor 206 can therefore enable either ESP read branching or ESP write branching by either setting or clearing the ENESP and ESPRD bits. Normal write commands and normal read commands are indicated by bits NORMWR and NORMRD being set in register HSTAT0 (0Ch), respectively.

Assume now that the initiator were to attempt to write ten blocks of data into ten sequential logical block addresses. The initiator may choose to do this with one autowrite command having a transfer length of ten and a starting logical block address of X. Alternatively, the initiator may choose to accomplish this write using two autowrite commands, one having a transfer length of five and a logical block address X, the other having a transfer length of five and a logical block address of X+5. If autowrite and ESP are both enabled, the SCSI interface portion 211 is able to distinguish between writes of contiguous data and writes of non-contiguous data. If the second write command is determined to be an ESP command, then the data of the second write command can be written into buffer memory 205 starting at a location which is contiguous with the locations of previously written data of the first write command. If, on the other hand, the second write command is determined not to be an ESP command, then the data of the second write command can be written into other locations in the buffer memory 205 which are not contiguous with previously written data of the first write command. Distinguishing such contiguous data and non-contiguous data aids in buffer management because all of such contiguous data may be later written at once from buffer memory to one area of disk 208 without intermittent seeking. Storing all this contiguous data into buffer memory 205 at contiguous locations therefore simplifies the subsequent reading of buffer memory 205 by the buffer management portion 213.

In accordance with the illustration in FIG. 4, a host autowrite pulse signal is output by SCSI interface portion 211 to buffer manager portion 213 on conductor HAWRP_H if the command received is an ordinary autowrite. Similarly, a host ESP pulse signal is output by SCSI interface portion 211 to buffer manager portion 213 on conductor HESPP_H if the command received is an ESP command. Which of the two conductors HAWRP_H and HESPP_H carries the pulse determines whether the data is contiguous data or non-contiguous data. Conductor HWRITE_H indicates to the buffer manager portion 213 whether the command is a read or a write. The signals allow the buffer manager portion 213 to prepare for contiguous or non-contiguous reads or writes of data.

As mentioned above, the SCSI sequencer block 221 comprises six basic parts: 1) a sequencer, 2) a sequencer memory, 3) an "instruction state machine", 4) a "CDB parsing state machine", 5) a "receive ID tag instruction state machine", and 6) a "send ID tag instruction state machine". The "instruction state machine" is a state machine for carrying out simple sequencer operation codes and is denoted "s_ins" in the VHDL code of microfiche Appendix B. The sequencer in turn comprises: 1) interface circuitry for reading and writing sequencer memory by microprocessor 206 (the interface circuitry is denoted "s_srctl" in the schematics of microfiche Appendix B), 2) circuitry which selects the next instruction to be executed by the sequencer (this circuitry is denoted "s_seqsel" in the VHDL code of microfiche Appendix B), and 3) a sequencer state machine which is denoted "s_seq" in the VHDL code of microfiche Appendix B. It is to be understood, however, that all embodiments in accordance with the present invention need not be partitioned in the particular way described and that the specific partitioning presented here is merely illustrative of one possible embodiment of a sequencer block.

In operation of the specific embodiment, the "s_seq", "s_seqsel" and the "sequencer memory" operate together so that the sequencer state machine steps through the instructions in the sequencer memory by branching to the appropriate locations. After reaching a new sequencer memory location, the s_seq sequencer state machine signals the s_ins "instruction state machine" to handle the operation indicated by the sequencer operation code at the new location. If the operation indicated is a relatively simple operation, the s_ins "instruction state machine" carries out the operation itself. If, on the other hand, the operation indicated is relatively complex, the s_ins "instruction state machine" initiates one of the other state machines (the "CDB parsing state machine", the "receive ID tag instruction state machine" or the "send ID tag instruction state machine") to carry out the operation. After the operation of the current sequencer operation code has been carried out, the "instruction state machine" s_ins has fulfilled its function and therefore signals the sequencer state machine s_seq to continue. The sequencer state machine then determines which location in sequencer memory to proceed to next.

Figure 8:
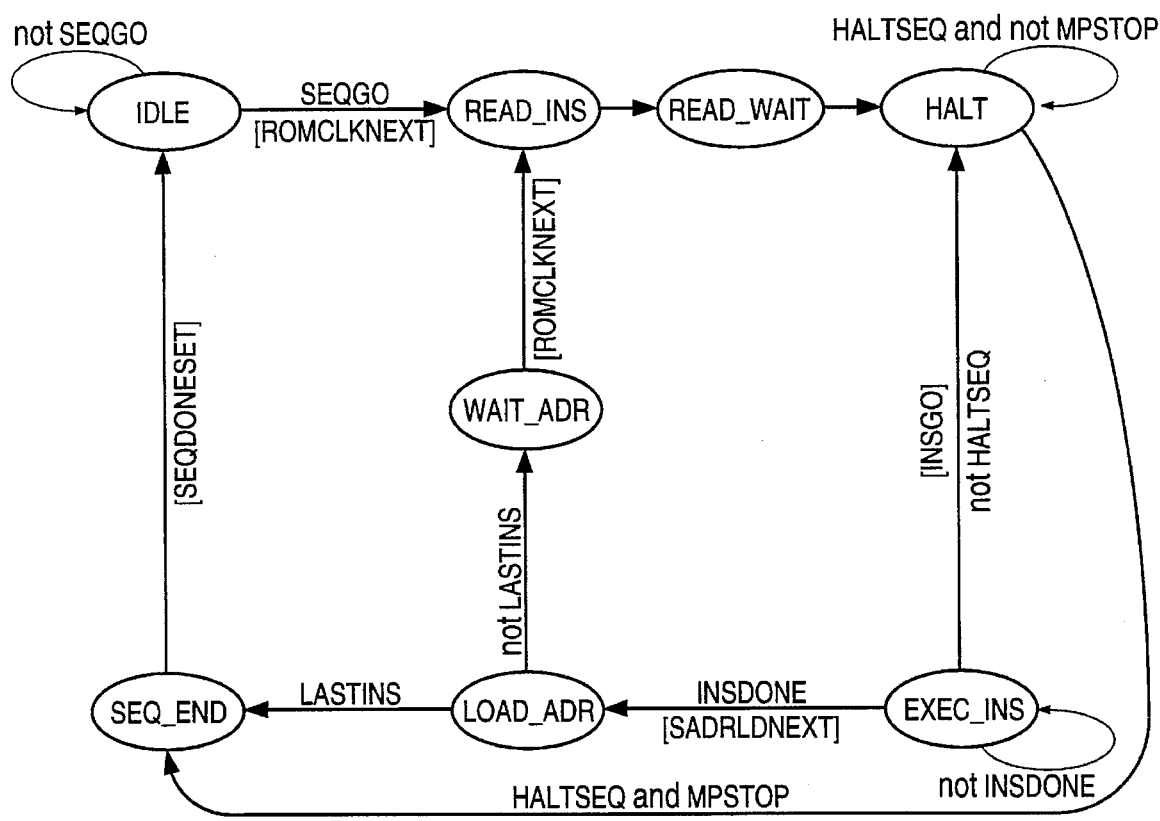
FIG. 8 is a state diagram illustrating operation of an embodiment of the sequencer of the SCSI sequencer block.

FIG. 8 is a state diagram illustrating operation of one possible sequencer in accordance with the present invention. After reading the sequencer instruction, the sequencer outputs an instruction go INSGO signal to the s_ins "instruction state machine". The state "EXEC_INS" in the lower right of FIG. 8 represents the execution of the instruction by the s_ins "instruction state machine". After the s_ins "instruction state machine" has completed the operation indicated by the sequencer operation code, the s_ins "instruction state machine" outputs an instruction done INSDONE signal to the sequencer so that the sequencer can continue to its next state.

Figure 9A:
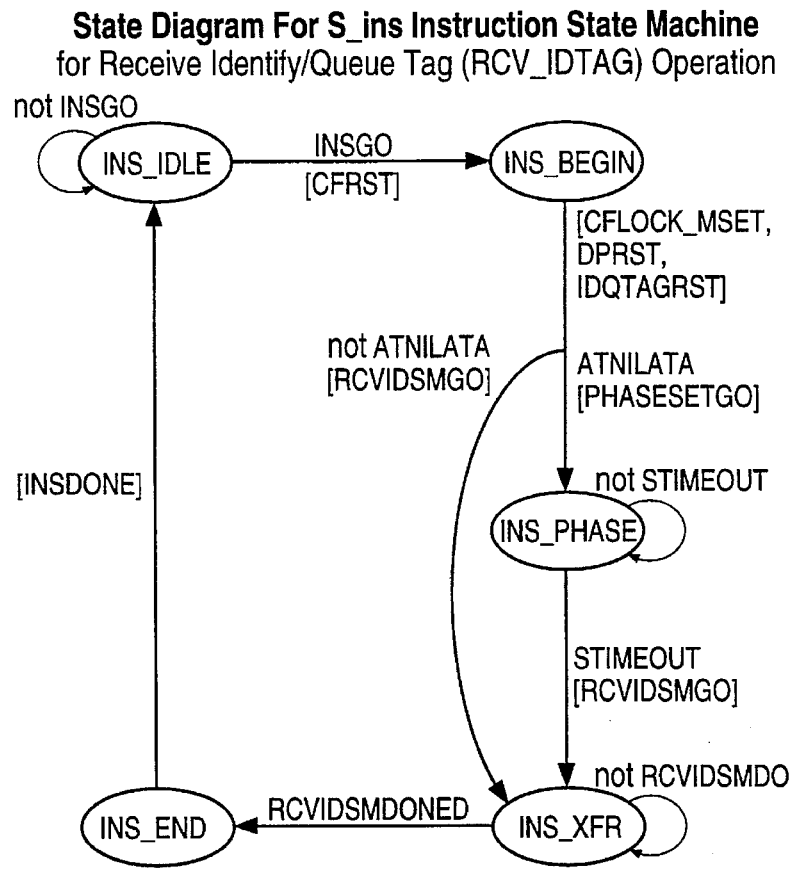
FIGS. 9A–9J are state diagrams illustrating operation of the "s_ins" instruction state machine of the sequencer of FIG. 8.
Figure 9B:
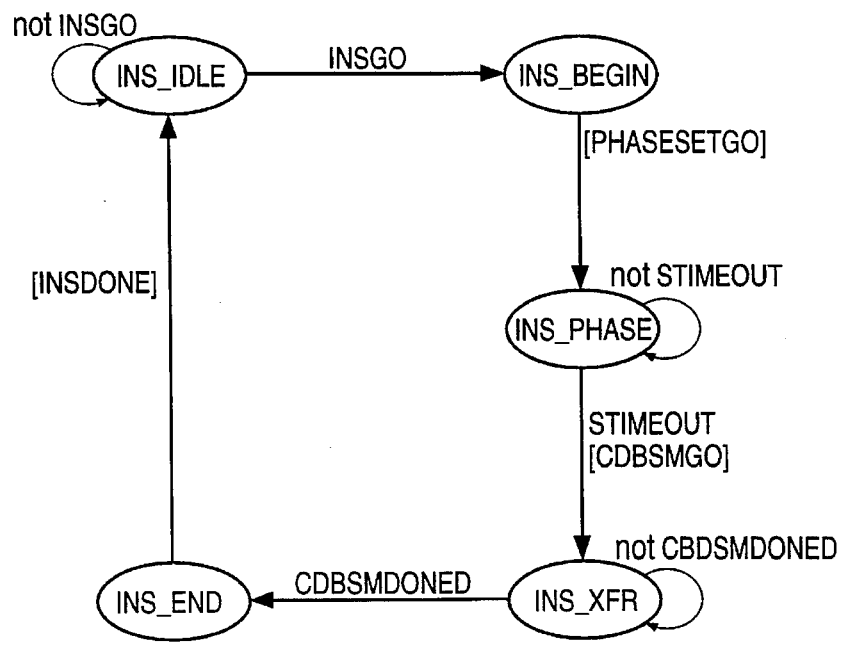
Figure 9C:
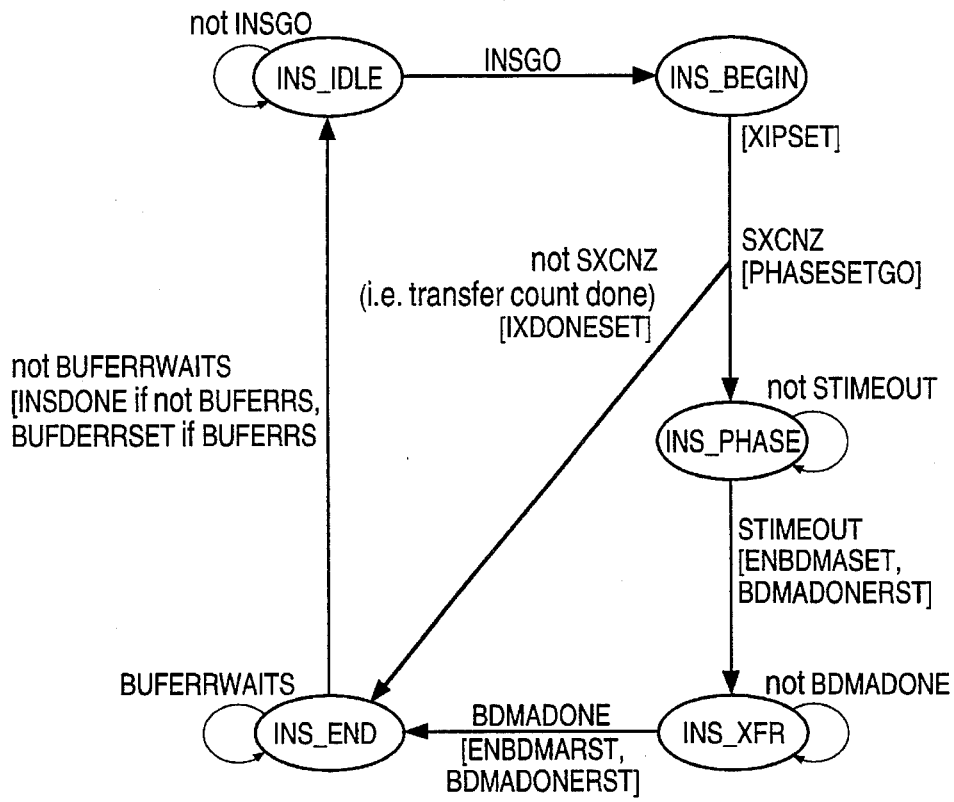
Figure 9D:
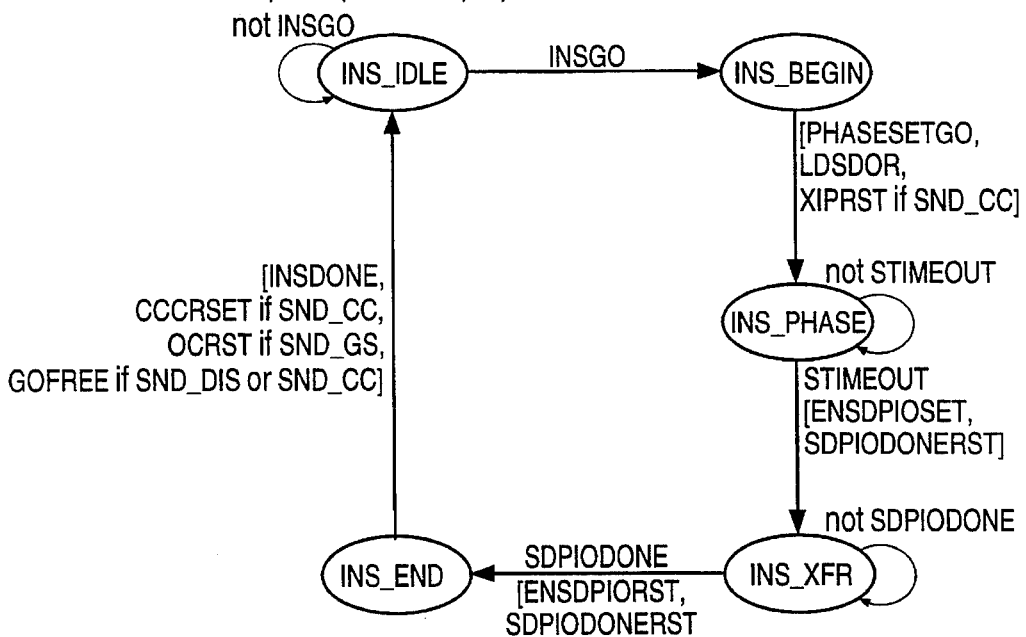
Figure 9E:
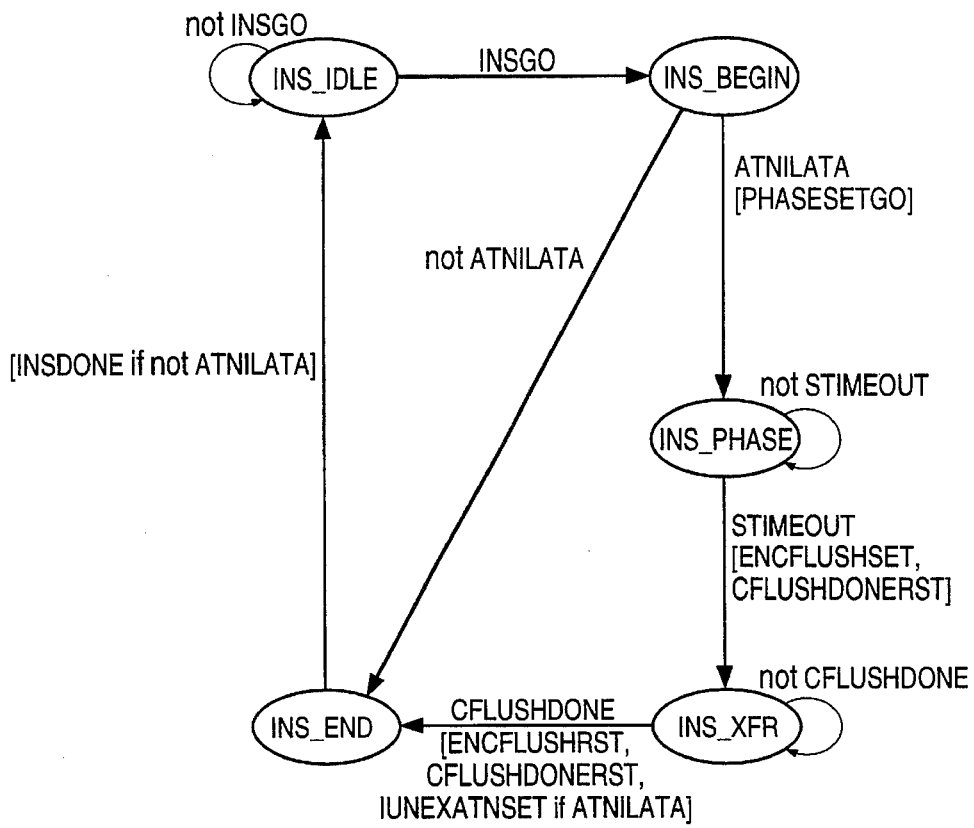
Figure 9F:
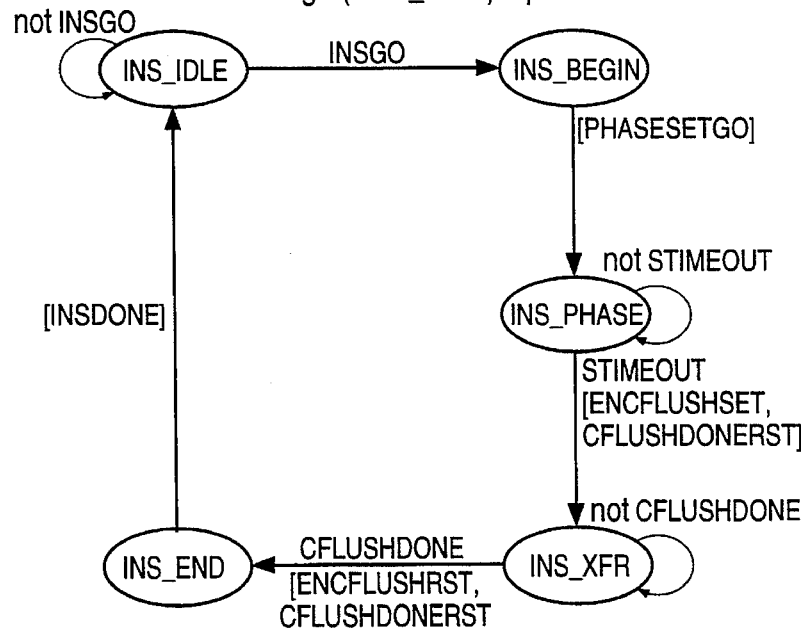
Figure 9G:
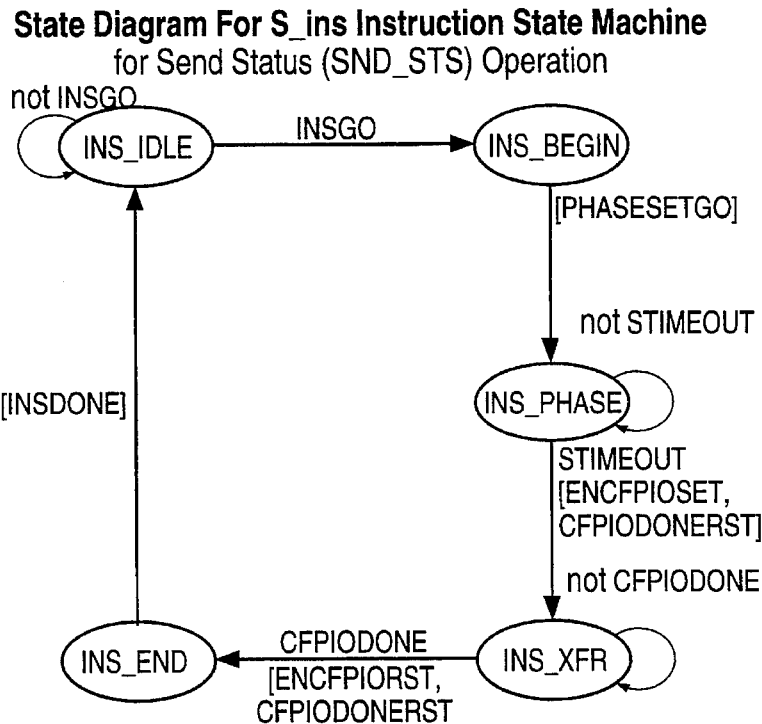

FIGS. 9A–9J are state diagrams illustrating operation of the s_ins "instruction state machine". If, for example, the sequencer instruction indicated by the sequencer operation code is the receive command instruction (RCV_CMD), then the s_ins "instruction state machine" operates as indicated in FIG. 9B. The state "INS_XFR" in the lower right of FIG. 9B represents the operation of the "CDB parsing state machine". The s_ins "instruction state machine" starts the "CDB parsing state machine" by outputting the CDB parsing state machine go CDBSMGO signal to the "CDB parsing state machine". After the "CDB parsing state machine" has parsed the SCSI command descriptor block, the "CDB parsing state machine" outputs a CDB state machine done CDBSMDONED signal to the s_ins "instruction state machine" so that the "instruction state machine" can continue to its next state.

If, on the other hand, the sequencer instruction indicated by the sequencer operation code is the receive ID tag command instruction (RCV_IDTAG), then the s_ins "instruction state machine" operates as indicated in FIG. 9A. The state "INS_XFR" in the lower right of FIG. 9A represents the operation of the "receive ID tag instruction state machine". The s_ins "instruction state machine" starts the "receive ID tag instruction state machine" by outputting the receive ID tag instruction state machine go RCVIDSMMGO signal to the "receive ID tag instruction state machine". After the "receive ID tag instruction state machine" has competed its function, the "receive ID tag instruction state machine" outputs a receive ID tag instruction state machine done RCVIDSMDONED signal to the s_ins "instruction state machine" so that the "instruction state machine" can continue to its next state.

Figure 9H:
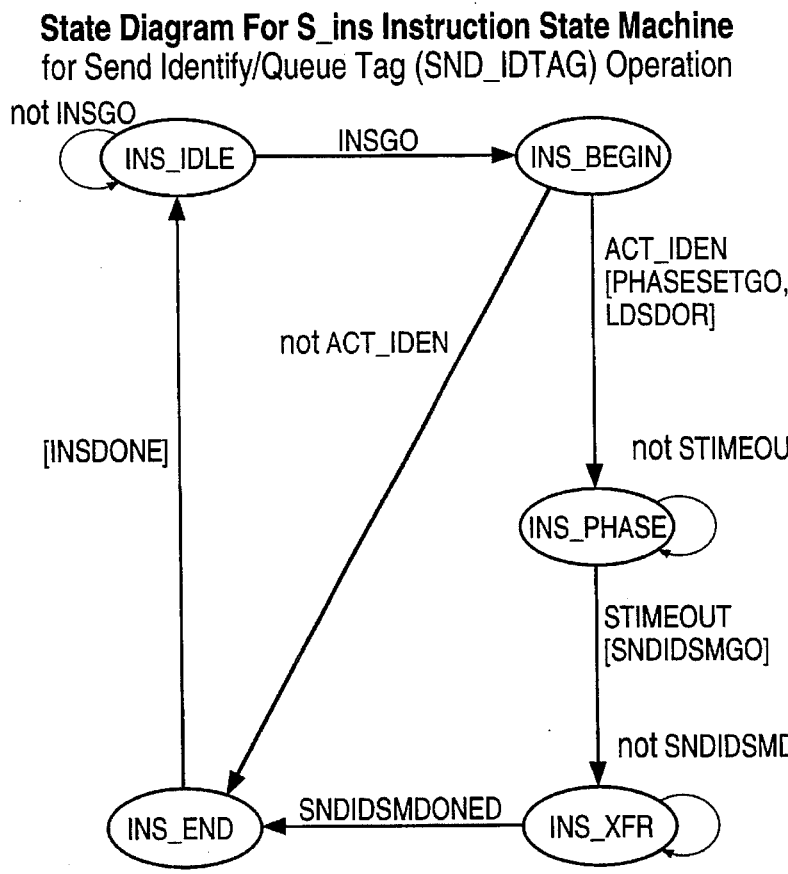
Figure 9I:
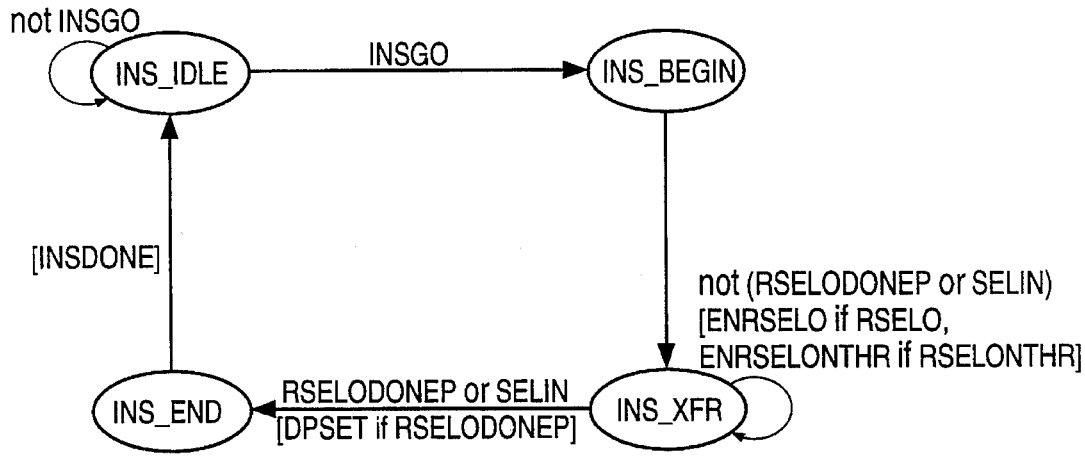
Figure 9J:
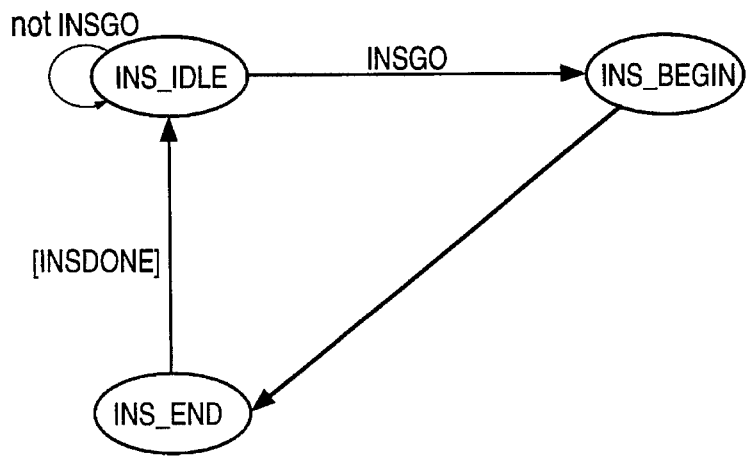
Figure 13A:
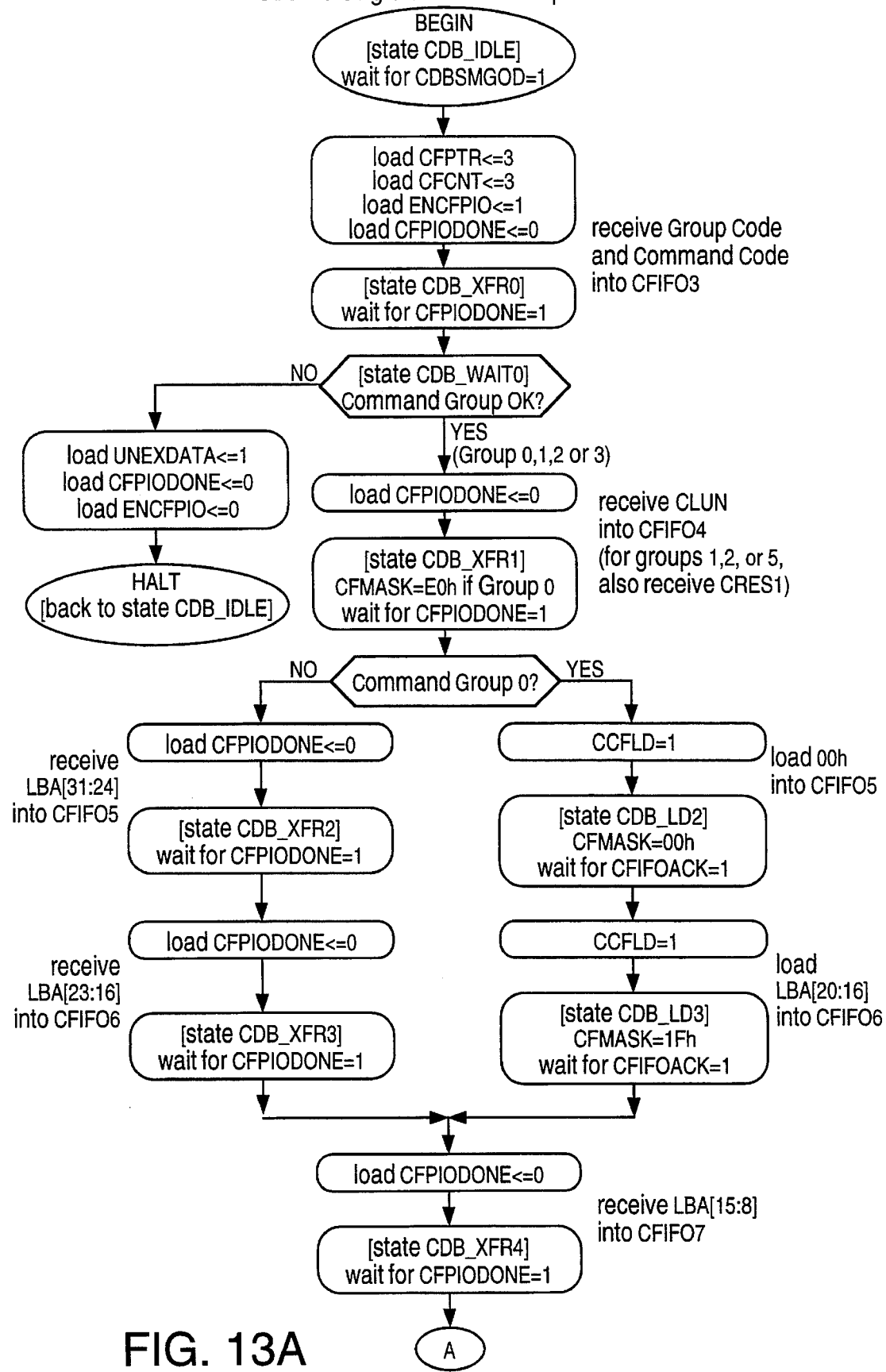
Figure 13C:
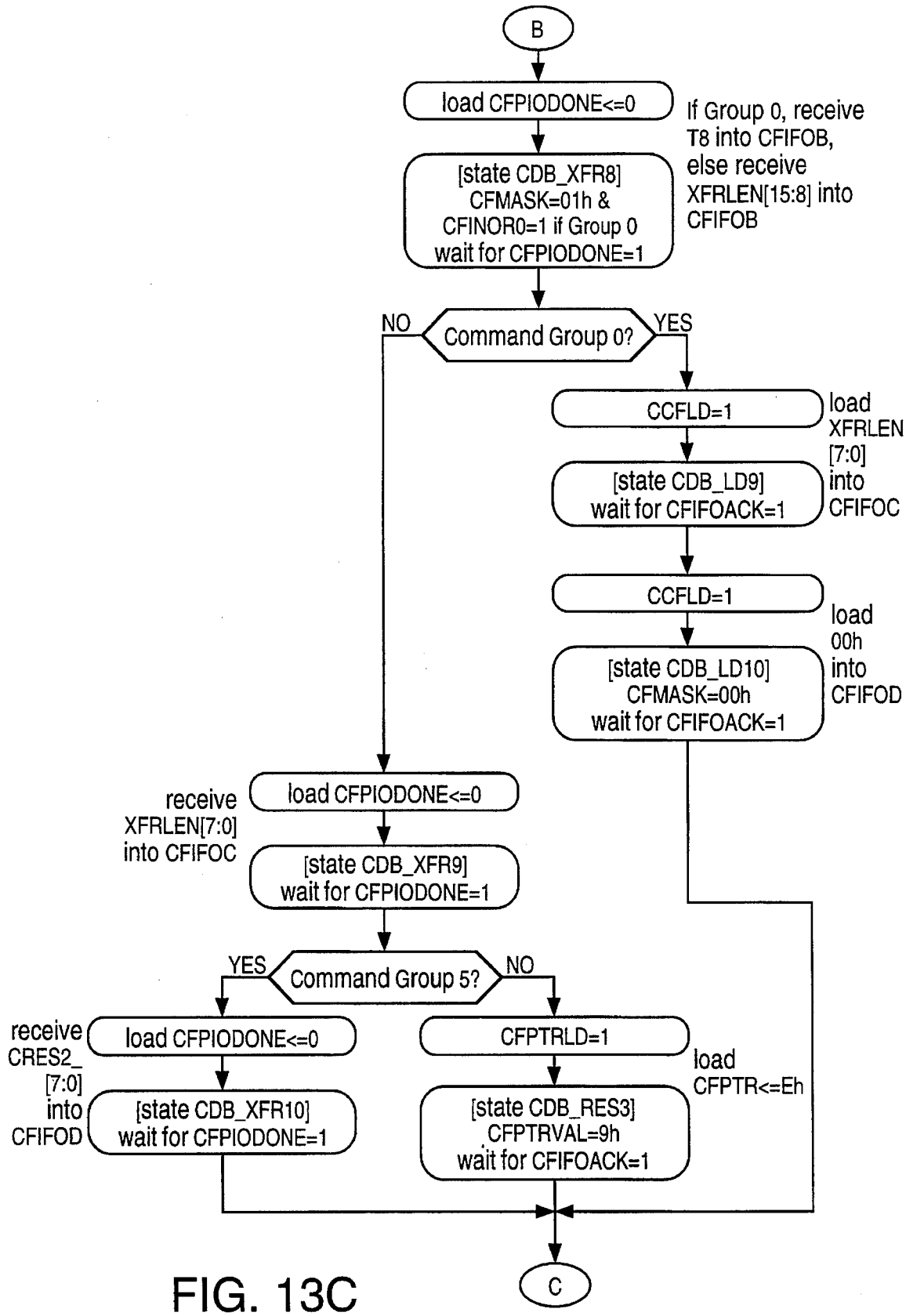
Figure 13D:
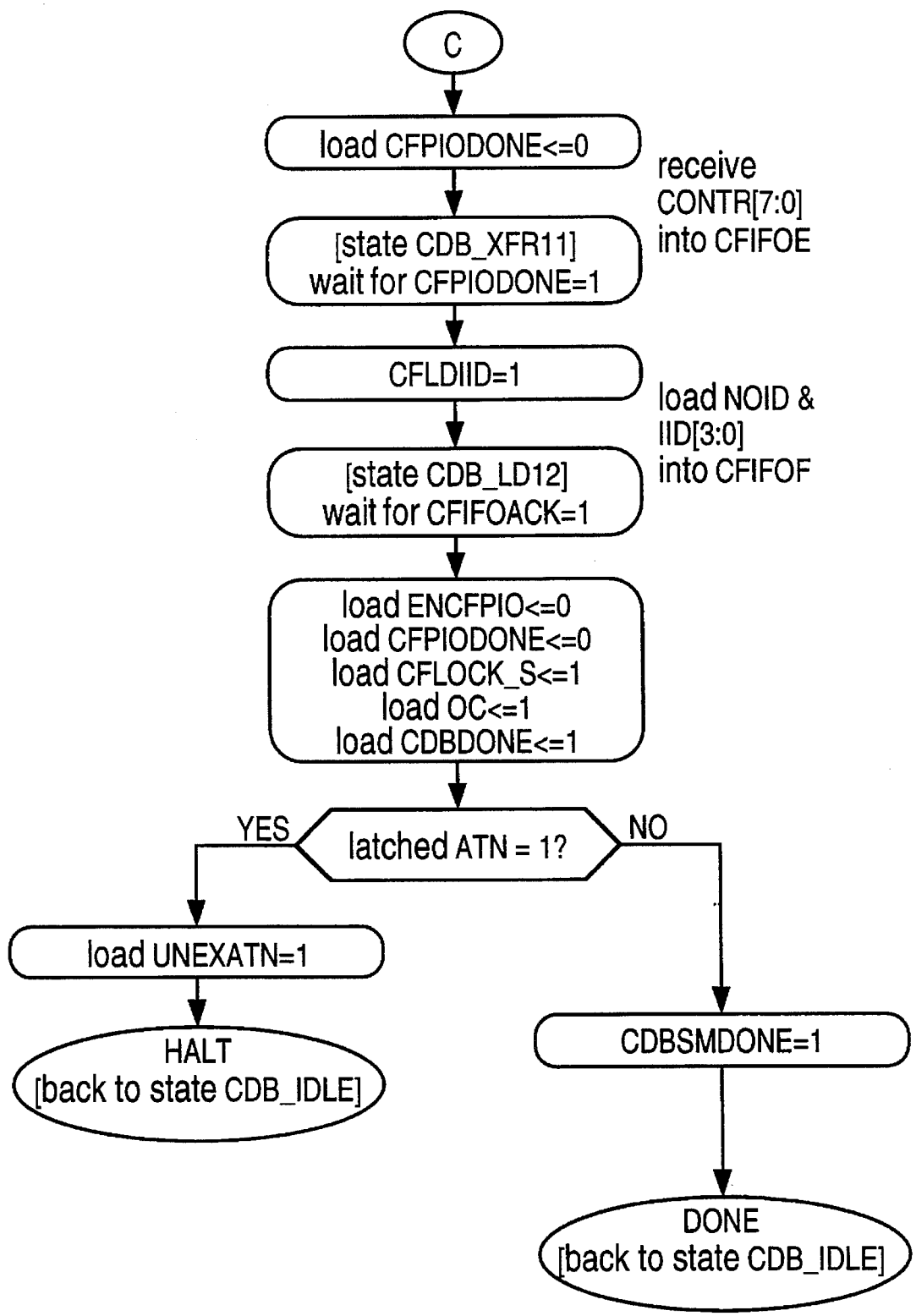

If, however, the sequencer instruction indicated by the sequencer operation code is the send ID tag command instruction (SND_IDTAG), then the s_ins "instruction state machine" operates as indicated in FIG. 9H. The state "INS_XFR" in the lower right of FIG. 9H represents the operation of the "send ID tag instruction state machine". The s_ins "instruction state machine" starts the "send ID tag instruction state machine" by outputting the send ID tag instruction state machine go SNDIDSMMGO signal to the "send ID tag instruction state machine". After the "send ID tag instruction state machine" has competed its function, the "send ID tag instruction state machine" outputs a send ID tag instruction state machine done SNDIDSMDONED signal to the s_ins "instruction state machine" so that the "instruction state machine" can continue to its next state.

The receive and send ID tag instruction state machines (both described in the same file "S_idqtag.vhd") are described further in VHDL hardware description language source code in microfiche Appendix D. The CDB parsing state machine ("S_cdb.xhd") is described further in VHDL hardware description language source code in microfiche Appendix C.

COMMAND DESCRIPTOR BLOCK PARSING

As illustrated in FIG. 7A, the SCSI command descriptor block of a command is parsed by execution of the sequencer instruction RCV_CMD at location 12h. Three portions of hardware are primarily responsible for carrying out the parsing of command descriptor blocks: 1) the "CDB parsing state machine", denoted "s_cdb" in the VHDL code of Appendix C, located in the SCSI sequencer block 221, 2) a CFIFO control block, denoted "s_cfctl" in the schematics of Appendix C, located in the FIFO control block 218, and 3) CFIFO block 217 denoted "s_cfifo" in the schematics of Appendix C.

The CFIFO block 217 is a 16×8 array of registers. In a specific embodiment, each register comprises a plurality of transparent D-latches coupled in parallel. Microprocessor 206 can read and write the registers of the CFIFO block (21h-30h) one at a time in any sequence, except that writing by the microprocessor is disabled when signal CFLOCK_M_H is asserted. Except for microprocessor reads and writes, the CFIFO is accessed as a first-in-first-out memory using the four-bit CFIFO pointer (bits CFPTR3 through CFPTR0 in register HCFPTR (20h)) which selects one of the sixteen registers for access.

The FIFO control block 218 in FIG. 4 comprises two portions: a block for controlling DFIFO block 216, and the CFIFO control block "s_cfctl" of interest here. The CFIFO control block "s_cfctl" comprises logic that generates control signals for reading and writing the CFIFO as well as two counter/registers: the CFIFO pointer CFPTR (bits 3 through 0 of register 20h), and the CFIFO count register CFCNT (bits 4 through 0 of register 1Fh). The CFIFO count register is a five-bit up/down counter whose value indicates the number of bytes of information which is present in the CFIFO.

The CDB parsing state machine "s_cdb" (also called the CDB state machine) is the state machine described above in connection with the execution of a SCSI autowrite command. This state machine is a dedicated state machine in contrast with an instruction based sequencer or a processor. The "CDB parsing state machine" controls which CFIFO register can be written with information from the SCSI bus 203. The CDB parsing state machine controls the CFIFO via the CFIFO pointer and by supplying write signals to the CFIFO to cause the CFIFO register indicated by the pointer to be loaded with information from SCSI bus 203. After receiving the first byte (byte 0) of a SCSI command into CFIFO byte 0 (CFIFO0 at 30h), the "CDB parsing state machine" determines from the group code field (bits 5-7 of byte 0) whether the CDB being received is a six-byte, ten-byte or twelve-byte CDB. Depending on which type of CDB is being received, the "CDB parsing state machine" writes the information from each of the fields of the CDB into a corresponding predetermined location in the sixteen-byte CFIFO (21h-30h).

FIG. 10A (PRIOR ART) is a diagram illustrating the fields of a six-byte command descriptor block and FIG. 10B is a diagram showing where information from each of the fields is written into the sixteen-byte CFIFO of the present invention. FIG. 11A (PRIOR ART) is a diagram illustrating the fields of a ten-byte command descriptor block and FIG. 11B is a diagram showing where information from each of the fields is written into the sixteen byte CFIFO of the present invention. FIG. 12A (PRIOR ART) is a diagram illustrating the fields of a twelve-byte command descriptor block and FIG. 12B is a diagram showing where information from each of the fields is written into the sixteen byte CFIFO of the present invention. Accordingly, it is seen that information from corresponding fields of six-byte, ten-byte and twelve-byte command descriptor blocks are written into the same location in the CFIFO. For example, the low byte of the transfer length field (denoted XFRLEN[7:0] in FIGS. 10A, 11A and 12A) is received as byte 4 of a six-byte CDB, byte 8 of a ten-byte CDB, and byte 9 of a twelve-byte CDB. The information content of the this low byte is, however, always written by the "CDB parsing state machine" into the same CFIFO register, register CFIFOC. Information from the other fields is similarly parsed and written into other predetermined registers of the CFIFO as indicated in FIGS. 10–12. If the command received does not contain a particular field of the sixteen-byte CFIFO, then the locations of the CFIFO which otherwise would hold the missing information are written with zeros in accordance with an embodiment of the present invention.

FIG. 13A–13D is a flowchart illustrating an operation of a "CDB parsing state machine" in accordance with an embodiment of the present invention. Note that labels starting with "H" in FIG. 5B correspond with similar labels in FIGS. 10–13 which lack the "H" but are otherwise identical. For example, labels HCFIFO0 through HCFIFOF of FIG. 5B refer to the same registers as labels CFIFO0 through CFIFOF in FIGS. 10–13, respectively. Refer to Appendix C for additional details with respect to the specific embodiment. The "instruction state machine" starts the "CDB parsing state machine" with the CDB state machine go signal CDBSMGO. The "CDB parsing state machine" signals the "instruction state machine" that the CDB has been parsed with the CDB state machine done signal CDBSMDONED. The "D" at the end of a signal name indicates that the corresponding signal without the "D" has been delayed by one clock cycle. Note, for example, that the first bubble of FIG. 13A references signal CDBSMGOD whereas the arrow going into the lower right bubble in FIG. 9B references signal CDBSMGO. It is to be understood, however, that other means for mapping the fields of FIGS. 10A, 11A and 12A into one set of memory locations such as that of FIG. 10B may be realized and that the present invention is not limited to the specific state machine described.

Although specific embodiments of the present invention have been described for instructional purposes in order to illustrate the present invention, the present invention is not limited thereto. The definition of an autotransfer command for purposes of determining whether to execute a command without waiting for a communication from a microprocessor can be different from the specific definition used by the sequencer of the specific embodiment described. In some embodiments, some bits in the reserved fields of a command may be set and the command may nevertheless be considered an autotransfer command. Moreover, in some embodiments, a microprocessor may be interrupted more than two times for the execution of an autotransfer command. Although the specific embodiment of the CDB parsing state machine deparses fields of information into a set of transparent D-latches, other information storage devices may be used. The information storage devices in some embodiments are a plurality of microprocessor accessible registers which together comprise a first-in-first-out memory. In some embodiments, the SCSI interface portion is modular and can be realized on a single integrated circuit along with various other circuits. The processor may, for example, be integrated onto the same chip as the disk controller. In other embodiments, a disk controller integrated circuit operates in conjunction with two microprocessors external to the disk controller integrated circuit. Accordingly, various adaptations, modifications and substitutions of various of the features of the specific embodiments described can be practiced without departing from the scope of the invention as defined in the appended claims.

I claim:

1. A method, comprising the steps of:

using a dedicated state machine of a disk controller integrated circuit to parse six-byte, ten-byte and twelve-byte SCSI command descriptor blocks and to store parsed information from said SCSI command descriptor blocks into said disk controller integrated circuit; and generating a signal in said disk controller integrated circuit indicative of whether said parsing and storing is completed.

2. The method of claim 1, wherein said six-byte SCSI command descriptor block contains a single transfer length byte, wherein said ten-byte SCSI command descriptor block contains a least significant transfer length byte and a most significant transfer length byte, wherein said twelve-byte SCSI command descriptor block contains a least significant transfer length byte, a most significant transfer length byte, and two additional transfer length bytes, wherein information from said single transfer length byte of said six-byte SCSI command descriptor block, information from said least significant transfer length byte of said ten-byte SCSI command descriptor block, and information from said least significant transfer length byte of said twelve-byte SCSI command descriptor block are all mapped into a single byte of memory in said disk controller integrated circuit.

3. The method of claim 1, wherein said disk controller integrated circuit further comprises a sequencer, said method further comprising the step of:

using said signal to cause said sequencer to transition states after said parsing and storing is completed.

4. A SCSI disk controller integrated circuit, comprising:

a first information storage device;

a second information storage device;

a third information storage device; and a dedicated state machine coupled to said first, second and third information storage devices, said dedicated state machine writing command code information and transfer length information from a six-byte SCSI command descriptor block into in said first and second information storage devices, respectively, said dedicated state machine writing command code information from a ten-byte SCSI command descriptor block into in said first information storage device, said dedicated state machine writing transfer length information from said ten-byte SCSI command descriptor block into in said second and third information storage devices.

5. The SCSI disk controller integrated circuit of claim 4, wherein said transfer length information of said six-byte SCSI command descriptor block consists of eight bits, said transfer length information of said ten-byte SCSI command descriptor block consists of sixteen bits, said second information storage device consists of eight bits, and said third information storage device consists of eight bits.

6. The SCSI disk controller integrated circuit of claim 5, wherein said first, second and third information storage devices are registers.

7. The SCSI disk controller integrated circuit of claim 6, wherein said registers are individually accessible registers of a memory of said integrated circuit.

8. The SCSI disk controller integrated circuit of claim 7, wherein said registers are operable as a first-in-first-out memory.

9. The SCSI disk controller integrated circuit of claim 4, wherein a SCSI command descriptor block comprises plurality of bytes, said dedicated state machine determining which of said plurality of bytes to write into said second information storage device based on information in said first byte of said plurality of bytes.

10. The SCSI disk controller integrated circuit of claim 9, wherein said information in said first byte is information in a command descriptor block group code.

11. A SCSI disk controller integrated circuit, comprising:

a plurality of memory locations;

means for parsing six-byte and ten-byte SCSI command descriptor blocks and for storing information from a plurality of fields of said SCSI command descriptor blocks into said memory locations such that information from corresponding fields in said six-byte and ten-byte SCSI command descriptor blocks are written into the same ones of said memory locations; and a sequencer which reads said memory locations, said sequencer being coupled to said means for parsing.

12. The SCSI disk controller integrated circuit of claim 11, wherein an eight bit transfer length field of said six-byte SCSI command descriptor block is stored by said means for parsing into a first eight of said memory locations, wherein a first eight bits of a sixteen bit transfer length field of said ten-byte SCSI command descriptor block is stored by said means for parsing into said first eight memory locations, and wherein a second eight bits of said sixteen bit transfer length field of said ten-byte SCSI command descriptor block is stored by said means for parsing into a second eight of said memory locations.

13. The SCSI disk controller integrated circuit of claim 11, wherein said sequencer signals said means for parsing to start parsing a SCSI command descriptor block and wherein said means for parsing signals said sequencer that said SCSI command descriptor block is parsed.

* * * * *

UNITED STATES PATENT AND TRADEMARK OFFICE
CERTIFICATE OF CORRECTION

PATENT NO. : 5,504,868
DATED : April 2, 1996
INVENTOR(S) : Shahe H. Krakirian

It is certified that error appears in the above-indentified patent and that said Letters Patent is hereby corrected as shown below:

Column 9, Table 1, Line 33, Delete "froom" and insert --from--;

Line 62, Delete "bye" and insert --byte--;

Column 11, Table 2., line 23, Delete "iin" and insert --in--;

Column 16, Line 50, Delete "B CCE" and insert --B_CCE--.

Signed and Sealed this

Twenty-ninth Day of October 1996

Attest:

BRUCE LEHMAN

*Attesting Officer*  *Commissioner of Patents and Trademarks*